United States Patent
Moser et al.

(10) Patent No.: US 9,180,962 B2
(45) Date of Patent: Nov. 10, 2015

(54) LEADING EDGE VARIABLE CAMBER SYSTEM AND METHOD

(71) Applicant: The Boeing Company, Chicago, IL (US)

(72) Inventors: Matthew A. Moser, Marysville, WA (US); Mark J. Gardner, Snohomish, WA (US); Michael R. Finn, Kirkland, WA (US); Mark S. Good, Seattle, WA (US); Adam P. Malachowski, Lynnwood, WA (US); Monica E. Thommen, Lynnwood, WA (US); Stephen R. Amorosi, Seattle, WA (US); Dan Onu, Redmond, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 14/034,987

(22) Filed: Sep. 24, 2013

(65) Prior Publication Data

US 2015/0083867 A1    Mar. 26, 2015

(51) Int. Cl.
*B64C 3/50* (2006.01)
*B64C 9/24* (2006.01)
*B64C 13/50* (2006.01)
*B64C 13/00* (2006.01)
*B64C 13/16* (2006.01)

(52) U.S. Cl.
CPC ... *B64C 3/50* (2013.01); *B64C 9/24* (2013.01); *B64C 13/00* (2013.01); *B64C 13/16* (2013.01); *B64C 13/503* (2013.01)

(58) Field of Classification Search
CPC .......... B64C 3/50; B64C 9/24; B64C 13/503; B64C 13/00; B64C 13/16
USPC .................................. 244/213, 214, 216, 217
See application file for complete search history.

(56) References Cited

U.S. PATENT DOCUMENTS

| | | | |
|---|---|---|---|
| 2,350,751 A | 6/1944 | Carlo et al. | |
| 3,822,047 A | 7/1974 | Schuldt, Jr. | |
| 4,106,730 A * | 8/1978 | Spitzer et al. | 244/183 |
| 4,725,026 A | 2/1988 | Krafka et al. | |
| 4,729,528 A * | 3/1988 | Borzachillo | 244/90 R |
| 4,821,981 A | 4/1989 | Gangsaas et al. | |
| 4,838,503 A | 6/1989 | Williams | |
| 5,056,741 A | 10/1991 | Bliesner | |
| 5,839,699 A | 11/1998 | Bliesner | |
| 6,152,405 A | 11/2000 | Muller | |
| 6,483,436 B1 * | 11/2002 | Emaci et al. | 340/686.1 |
| 6,913,228 B2 | 7/2005 | Lee | |

(Continued)

FOREIGN PATENT DOCUMENTS

| | | |
|---|---|---|
| EP | 0193442 | 9/1986 |
| EP | 0291328 | 1/1991 |

(Continued)

OTHER PUBLICATIONS

Airbus, "Getting to Grips with Aircraft Performance," Jan. 2002.

(Continued)

*Primary Examiner* — Justin Benedik

(57) ABSTRACT

A system for varying a wing camber of an aircraft wing may include a leading edge device coupled to the wing. The leading edge device may be configured to be actuated in an upward direction and a downward direction relative to a retracted position of the leading edge device.

22 Claims, 20 Drawing Sheets

(56) References Cited

U.S. PATENT DOCUMENTS

| | | | |
|---|---|---|---|
| 7,494,094 | B2 | 2/2009 | Good et al. |
| 7,556,224 | B2 | 7/2009 | Johnson |
| 7,641,152 | B2 | 1/2010 | Onu et al. |
| 7,726,610 | B2 | 6/2010 | Good et al. |
| 8,356,766 | B2 | 1/2013 | Garthaffner |
| 8,424,810 | B1 * | 4/2013 | Shmilovich et al. .......... 244/214 |
| 8,954,208 | B2 | 2/2015 | Yamasaki |
| 2002/0074459 | A1 | 6/2002 | Gleine |
| 2005/0011994 | A1 | 1/2005 | Sakurai et al. |
| 2005/0151028 | A1 * | 7/2005 | Pohl et al. .................... 244/213 |
| 2006/0049308 | A1 | 3/2006 | Good et al. |
| 2010/0200704 | A1 * | 8/2010 | Berens et al. ............... 244/76 A |
| 2011/0127385 | A1 | 6/2011 | Morris |
| 2012/0032030 | A1 | 2/2012 | Ruckes et al. |

FOREIGN PATENT DOCUMENTS

| | | | |
|---|---|---|---|
| EP | 1547917 | A1 | 6/2005 |
| EP | 2465770 | | 6/2012 |
| FR | 2902756 | A1 | 12/2007 |
| GB | 2186849 | * | 8/1987 ............... B64C 3/50 |
| GB | 2186849 | A | 8/1987 |
| WO | WO9915403 | A2 | 4/1999 |

OTHER PUBLICATIONS

Delta Virtual Airlines, "Boeing 777-200ER Aircraft Operating Manual," Nov. 2005.
The Boeing Company, "777 Flight Crew Operations Manual—Flight Controls," Dec. 15, 2003.
Mark Goldhammer, "The Next Decade in Commercial Aircraft Aerodynamics," Mar. 31, 2011.
European Search Report for 14186005.6, dated Feb. 9, 2015.

* cited by examiner

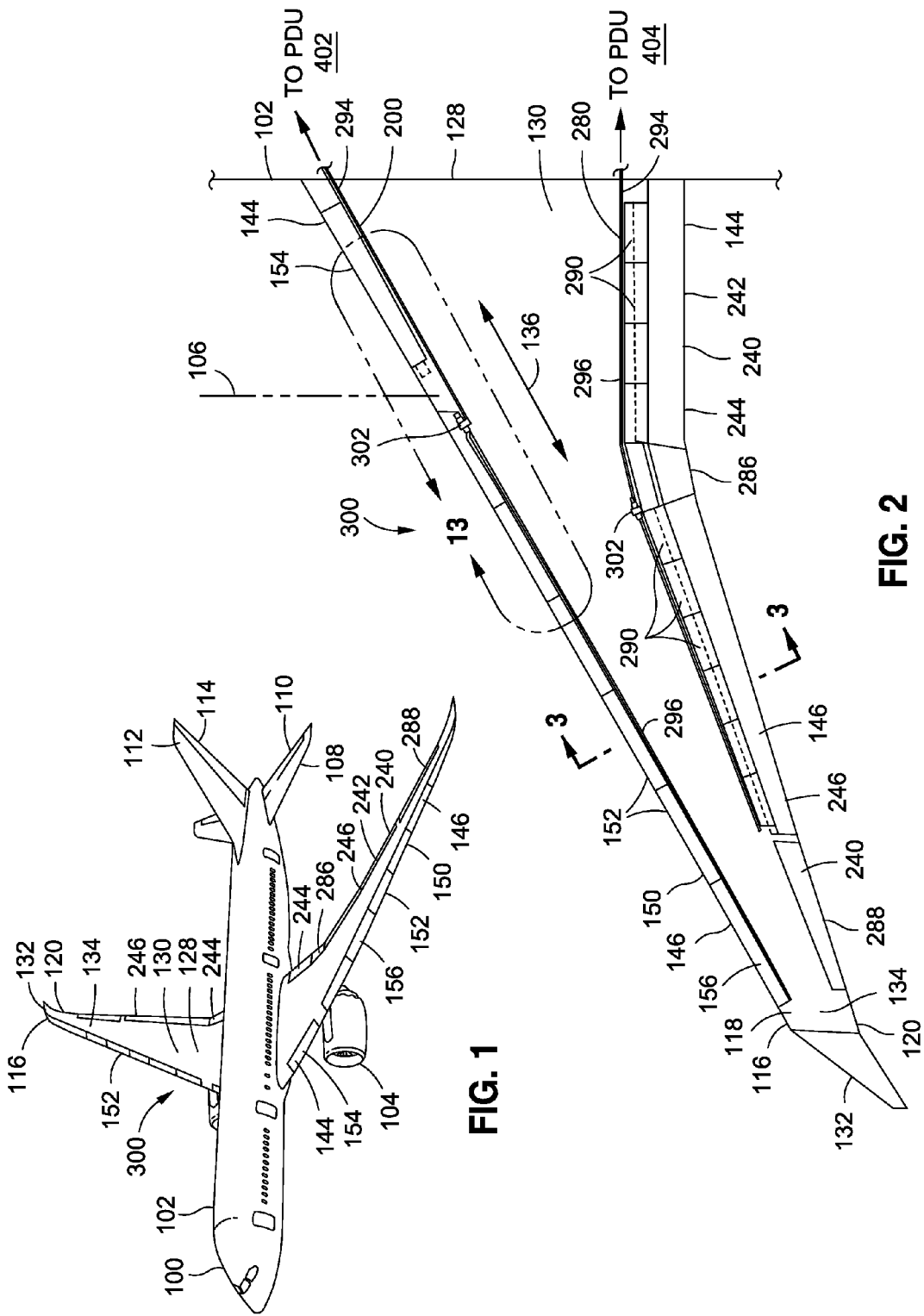

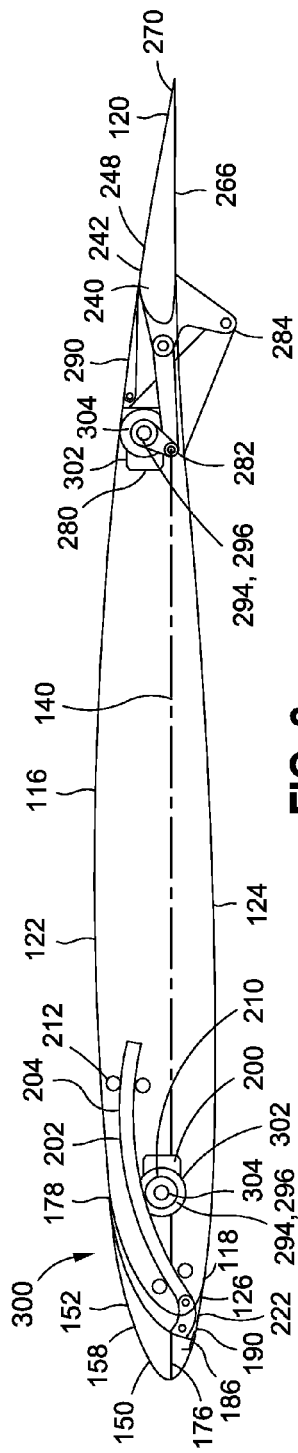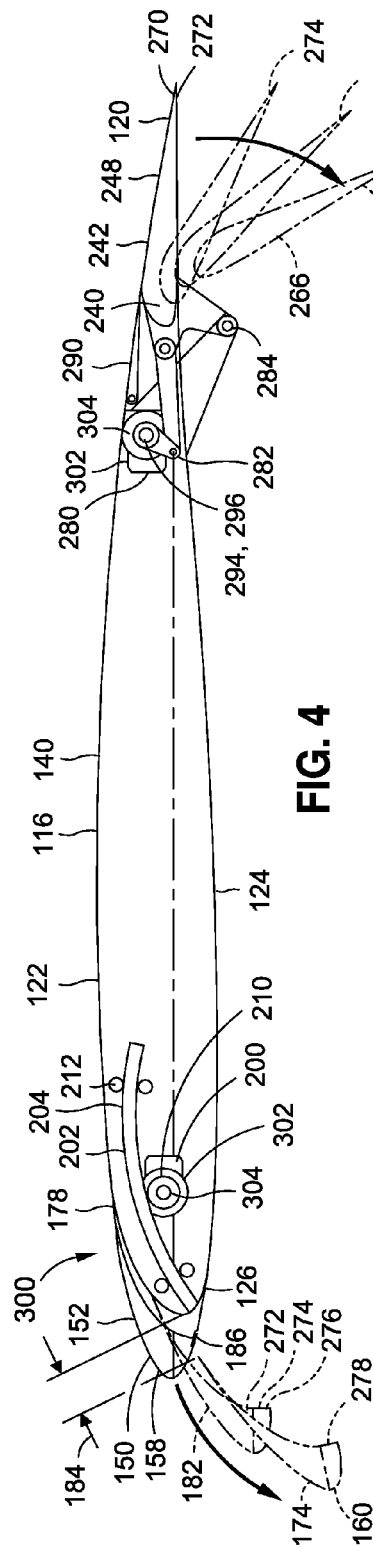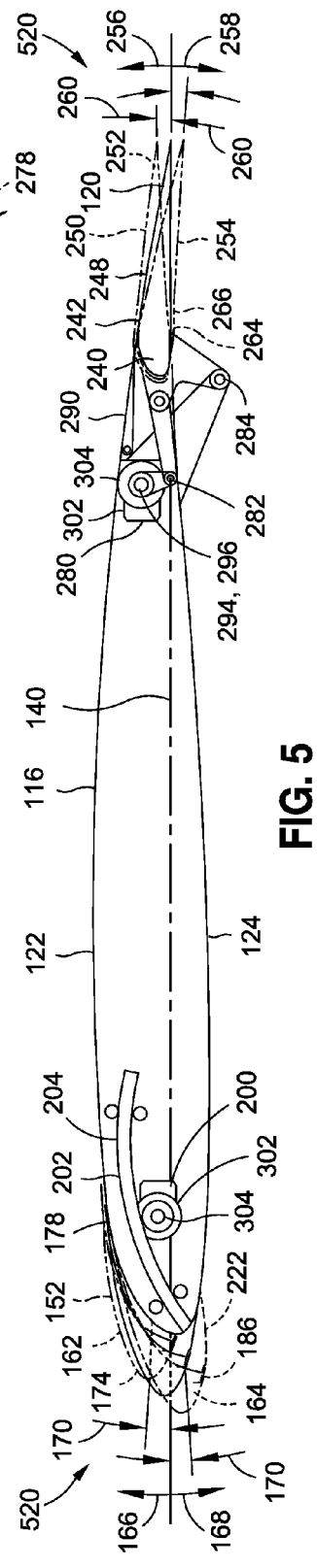

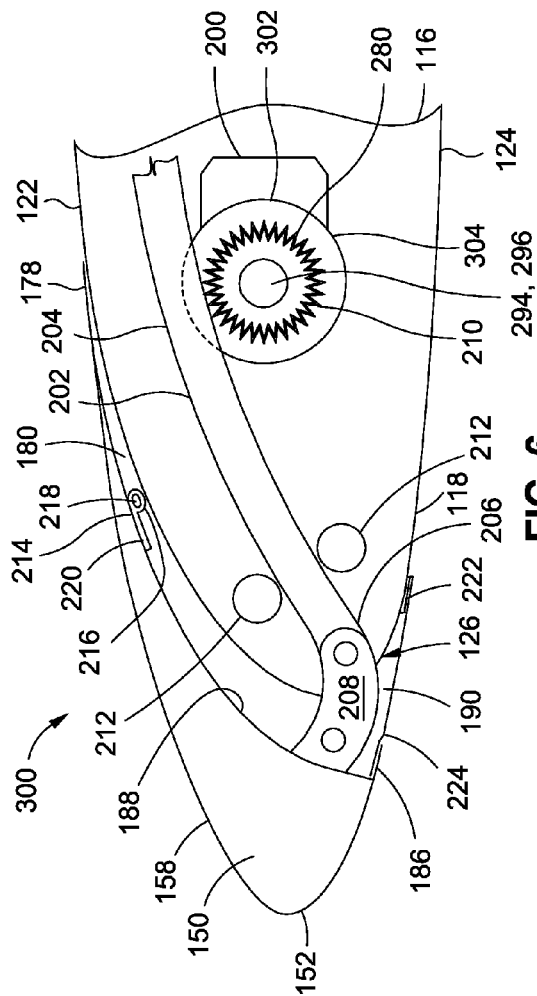
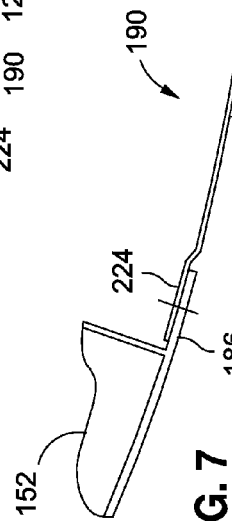
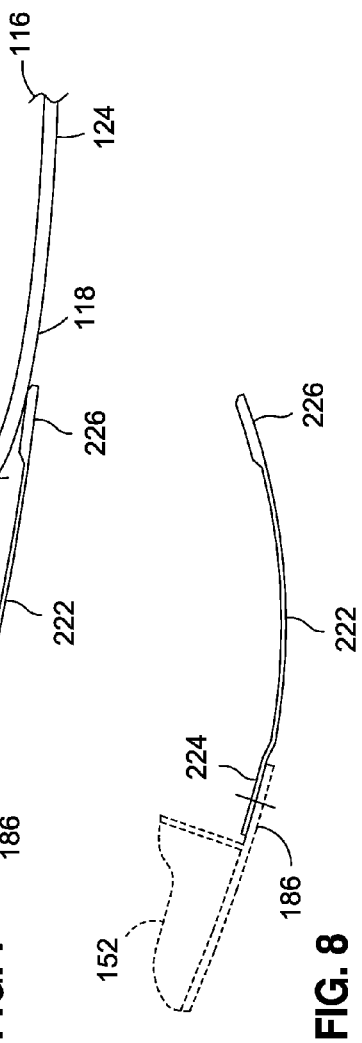
FIG. 6
FIG. 7
FIG. 8

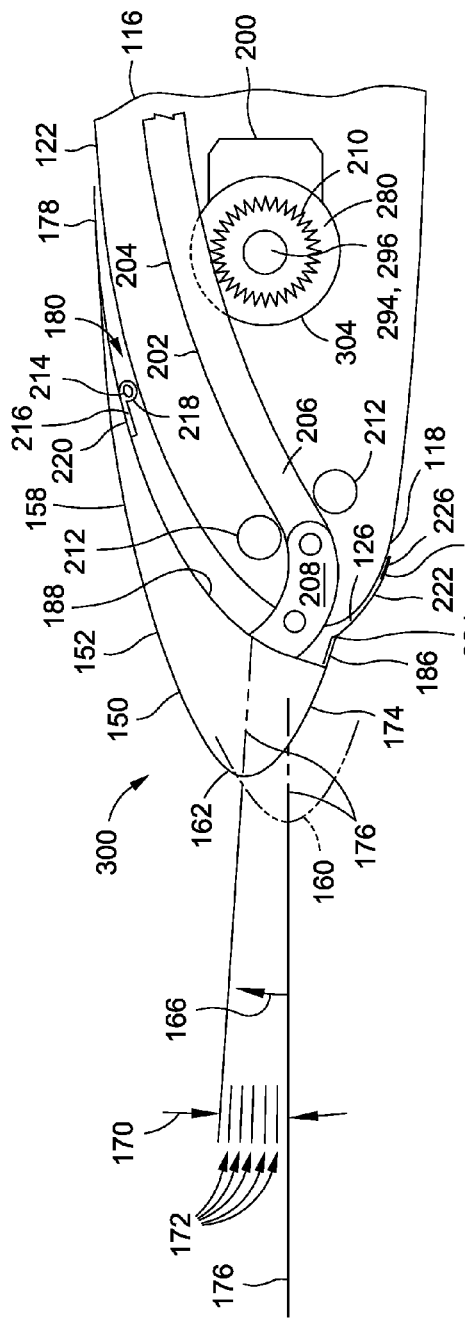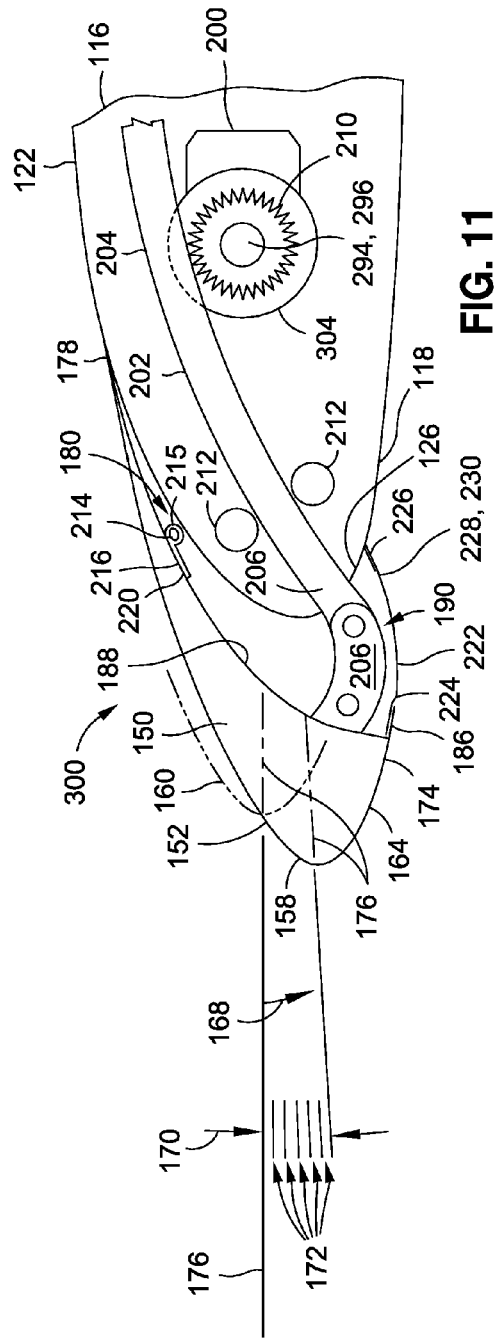

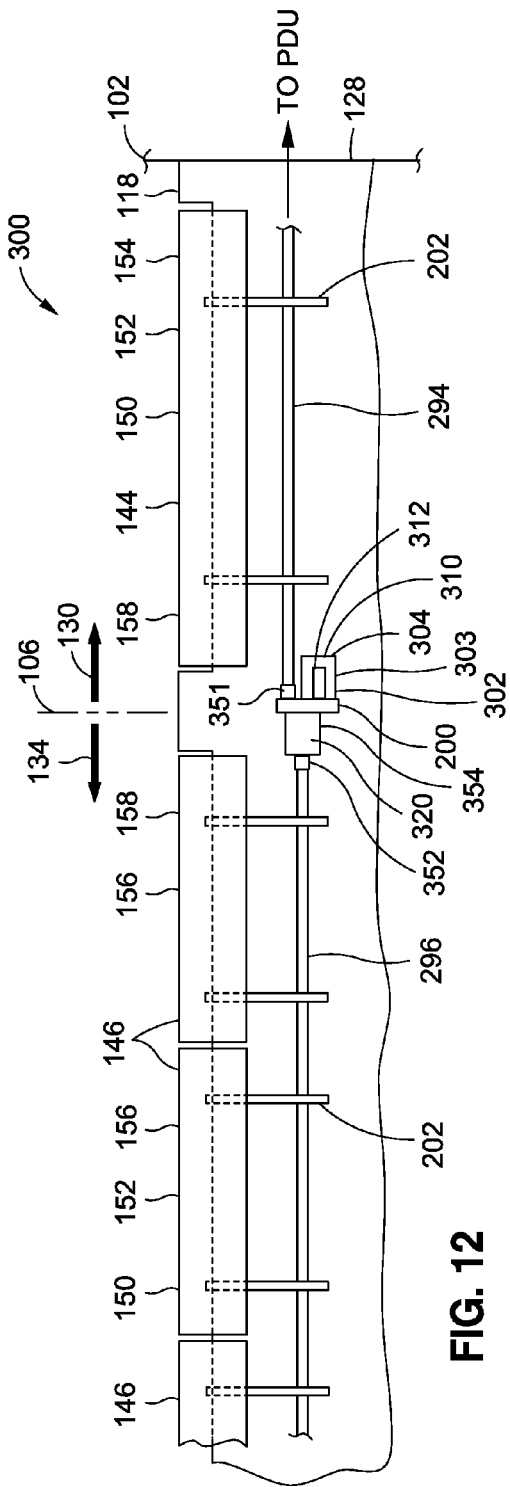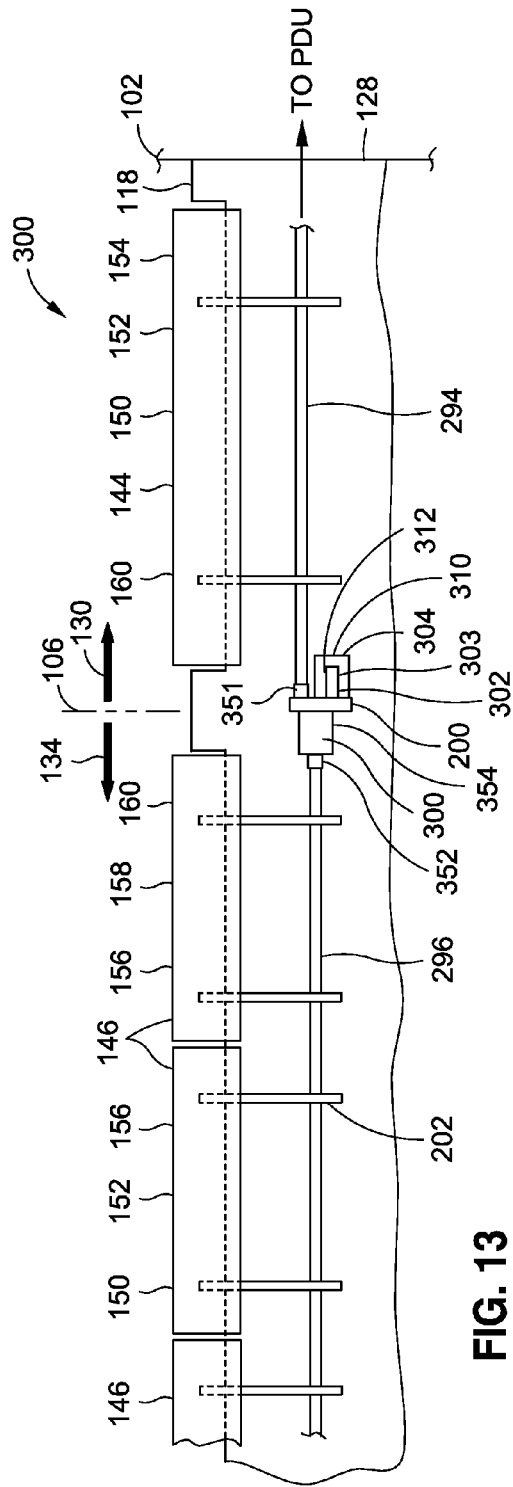

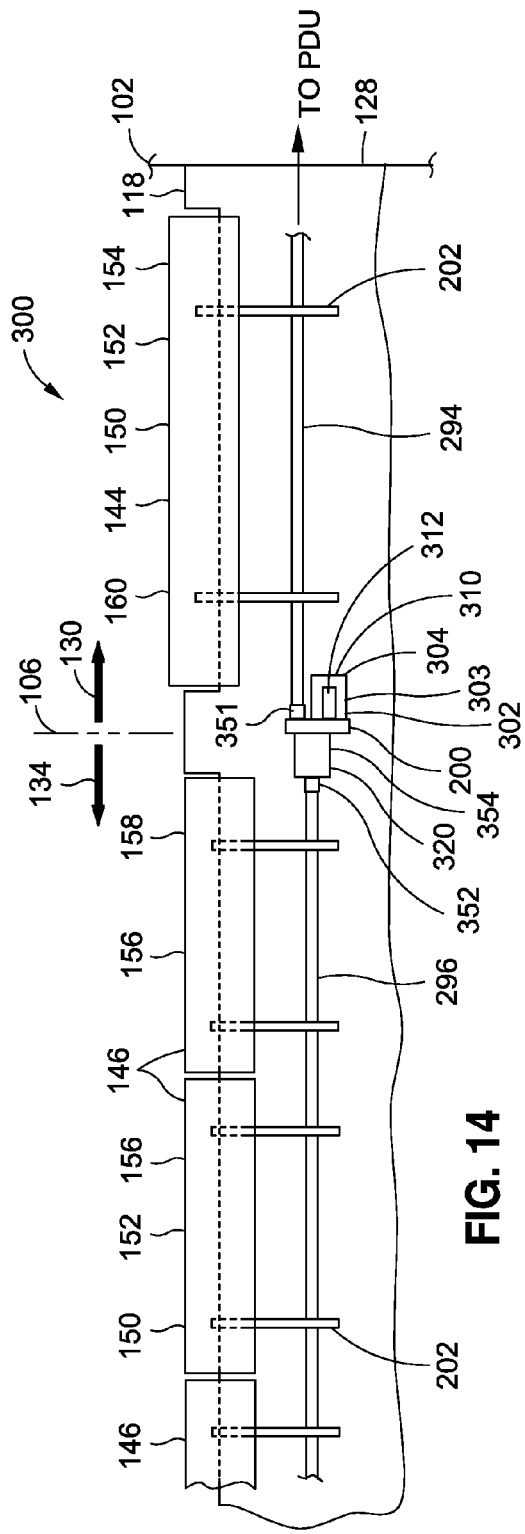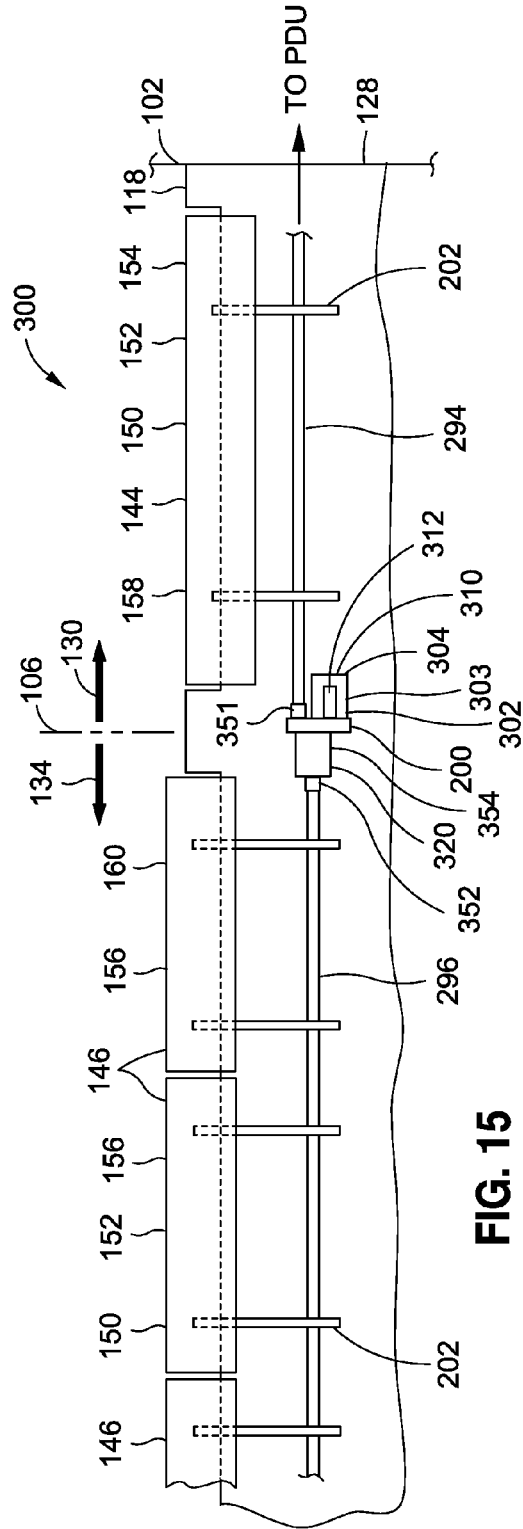

LEADING EDGE VARIABLE CAMBER SYSTEM AND METHOD

FIELD

The present disclosure relates generally to flight controls and, more particularly, to the positioning of leading edge devices of an aircraft.

BACKGROUND

Aircraft such as commercial airliners typically include control surfaces mounted on the wings, which may be used to improve the aerodynamic performance of the aircraft. Such control surfaces include wing leading edge devices and wing trailing edge devices and which may be extended and/or deflected during different phases of flight to alter the lift and/or drag characteristics of the wings. For example, commercial airliners typically include trailing edge flaps which may be extended during takeoff and landing to increase the camber of the wings such that the wings generate increased lift.

In conventional airliners, the trailing edge flaps are typically extendable by fixed increments corresponding to standard flap settings (e.g., flaps 5, 15, 20, 25, and 30). In conventional airliners, the trailing edge flaps are typically retracted when the airliner is at a cruising altitude, for example to avoid a drag penalty and/or avoid subjecting the wings to increased loading during certain flight maneuvers. Higher loads may require an increase in the strength of the wings, which may lead to a typically undesirable increase in the structural weight of the aircraft.

SUMMARY

The present disclosure describes systems and methods for positioning leading edge devices of an aircraft. A system according to the present disclosure may include a leading edge device coupled to a wing of an aircraft. The leading edge device may be configured to be actuated in an upward direction and a downward direction relative to a retracted position of the leading edge device.

Also disclosed is an aircraft having a wing and a slat coupled to a leading edge of the wing. The aircraft may further include a slat actuation system configured to actuate the slat in an upward direction and a downward direction relative to a retracted position of the slat.

Additionally disclosed is a method of varying a wing camber of a wing. The method may include actuating a leading edge device of an aircraft in an upward direction relative to a retracted position of the leading edge device to reduce a camber of the wing while the aircraft is in flight.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;
FIG. 2 is a top view of a wing of the aircraft;
FIG. 3 is a sectional view taken along line 3 of FIG. 2 and illustrating a leading edge slat and a trailing edge flap in their retracted positions;
FIG. 4 is a sectional view of the wing illustrating the extended positions of the slat and the flap;
FIG. 5 is a sectional view of the wing illustrating upward and downward deflection of the slat and the flap in relatively small deflection angles;
FIG. 6 is an enlarged sectional view of the slat in a retracted position on the leading edge of the wing;
FIG. 7 is an enlarged view of the slat lower seal for sealing a lower gap between the slat lower edge and the wing lower surface;
FIG. 8 is an enlarged view of the slat lower seal having a preformed curvature along a forward-aft direction of the slat lower seal;
FIG. 10 is a schematic illustration of the wing leading edge illustrating a slat actuated in an upward direction relative to a refracted position the slat;
FIG. 11 is a schematic illustration of the wing leading edge illustrating a slat actuated in a downward direction relative to a retracted position of the slat;
FIG. 12 is a diagrammatic plan view of a leading edge of the wing taken along line 13 of FIG. 2 and schematically illustrating a variable camber trim unit (VCTU) positioned between an inboard slat and an outboard slat mounted to the wing leading edge;
FIG. 13 is a diagrammatic plan view of the leading edge of the wing illustrating the inboard slat and outboard slat actuated in unison;
FIG. 14 is a diagrammatic plan view of the leading edge of the wing illustrating the inboard slat actuated independently of the outboard slat;
FIG. 15 is a diagrammatic plan view of the leading edge of the wing illustrating the outboard slat actuated independently of the inboard slat.

DETAILED DESCRIPTION

Figure 9:
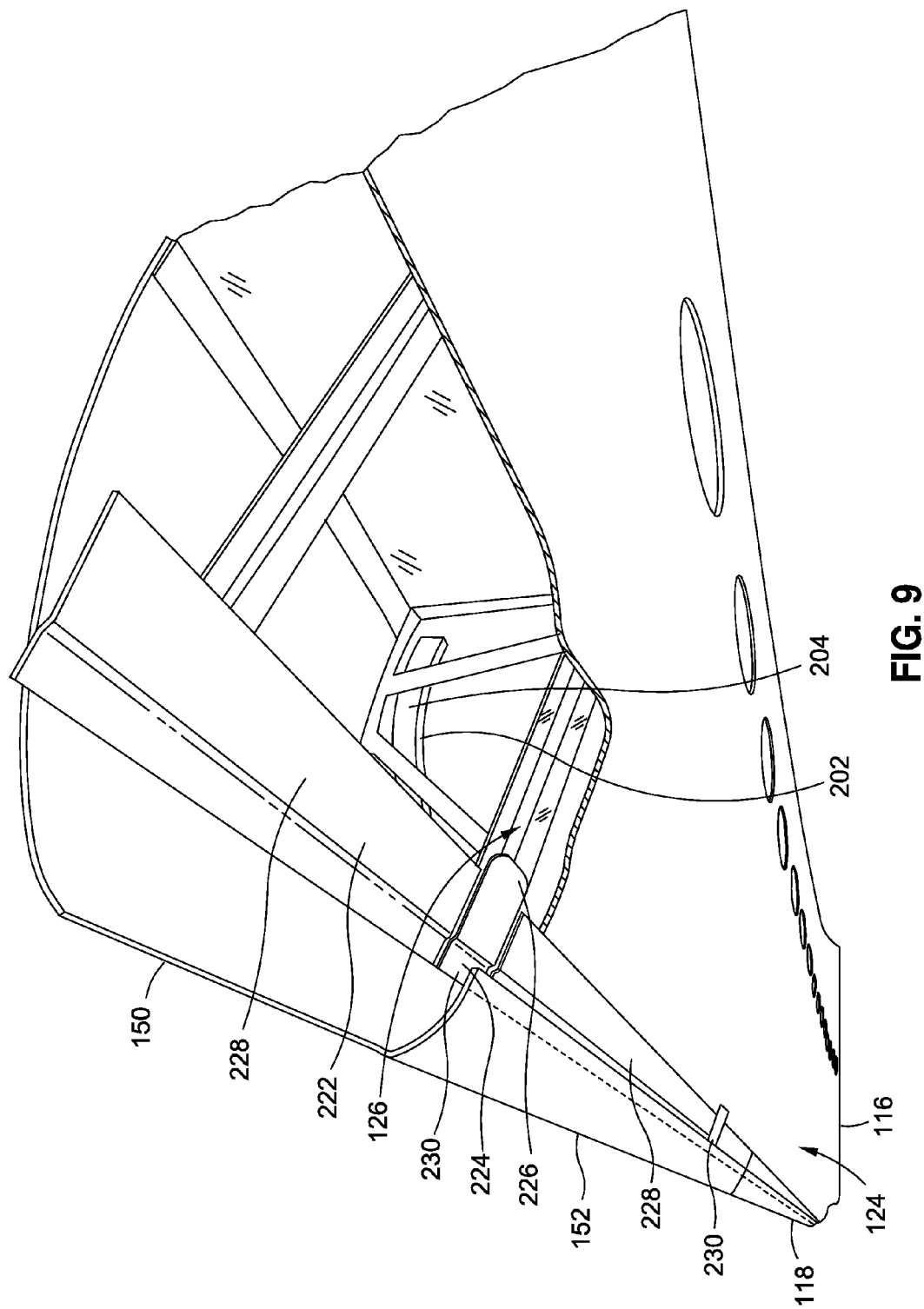
FIG. 9 is a perspective illustration of an underside of the leading edge of the wing illustrating the installation of the slat lower seal configured as a plurality of seal skirts and seal doors covering a lower gap between the slat lower edge and the wing lower surface.

Referring now to the drawings wherein the showings are for purposes of illustrating various embodiments of the present disclosure, shown in FIG. 1 is a perspective view of an aircraft 100 having a fuselage 102 and a pair of wings 116. Each wing 116 may be attached to the fuselage 102 and may extend from a wing root 128 outwardly toward a wing tip 132. One or more propulsion units 104 may be mounted on the wings 116, or to the fuselage 102 or other structure of the aircraft 100. The aircraft 100 may further include an empennage including a horizontal tail 108 and elevator 110, and a vertical tail 112 and rudder 114 for directional control of the aircraft 100. The aircraft 100 may include one or more leading edge devices 150 and trailing edge devices 240 which may be deflected (e.g., extended and/or retracted) to alter the lift characteristics and/or drag characteristics of the wings 116.

Aircraft according to the present disclosure may include a system 300 for varying a wing camber of the wings 116 of the aircraft 100. Accordingly, the system 300 may interchangeably be referred to herein as a variable camber system 300 (see e.g., FIG. 23). The system 300 may be configured to allow for dynamically adjusting the position of one or more leading edge devices 150 to alter the wing camber during different phases of flight such as during climb, cruise, and descent. The variable camber system 300 may adjust the leading edge devices 150 upwardly and downwardly relative to a retracted position of the leading edge devices 150. The variable camber system 300 may adjust the leading edge devices 150 upwardly and downwardly at relatively small deflection angles to reduce aerodynamic drag of the wings 116 (FIG. 1).

The variable camber system 300 may adjust the leading edge devices 150 at small deflection angles to optimize the spanwise load distribution which may allow for a reduction in the structural weight of the aircraft 100 as described below. In some examples, the variable camber system 300 may be configured to adjust one or more trailing edge devices 240 (FIG. 1) in conjunction with the adjustment of the leading edge devices 150. The reduction in aerodynamic drag and optimization of the spanwise load distribution may advantageously decrease fuel burn and may result in an increase in the range and/or payload-carrying capability of the aircraft 100.

Although described in the context of a tube-and-wing aircraft 100 configuration as shown in FIG. 1, the variable camber system 300 may be implemented in any aircraft configuration, without limitation, including a blended-wing configuration, a hybrid wing-body configuration, and other aircraft configurations.

In FIG. 2, shown is an embodiment of an aircraft wing 116 incorporating the variable camber system 300. The wing 116 may have leading edge devices 150 configured as slats 152 mounted to the wing leading edge 118. The slats 152 may include one or more inboard slats 154 and one or more outboard slats 156. However, the inboard devices 144 and/or outboard devices 146 on the leading edge 118 may be configured as Krueger flaps or in other leading edge device 150 configurations, and are not limited to slats 152. In the present disclosure, the propulsion unit centerline 106 may be defined as the dividing line between the inboard devices 144 and the outboard devices 146. However, any point along a spanwise direction 136 of the wing 116 may serve as the dividing line between the inboard devices 144 and the outboard devices 146.

In FIG. 2, the wing 116 may include trailing edge devices 240 such as flaps 242 and other trailing edge devices 240. The trailing edge devices 240 may include inboard devices 144 and outboard devices 146. The inboard devices 144 may include one or more inboard flaps 244, and an inboard roll-control flap 242 device configured as a flaperon 286 (e.g. combination flap-aileron). The outboard devices 146 may include one or more outboard flaps 246, and an outboard roll-control flap device such as an aileron 288. However, the trailing edge device 240 may be provided in alternative configurations including, but not limited to, elevons, and other trailing edge device configurations.

In FIG. 2, in an embodiment, the inboard devices 144 on the leading edge 118 and the trailing edge 120 may be coupled to an inboard torque tube 294 or other mechanical linkage for actuating the inboard devices 144 such as by a centrally-located power drive unit 400 (PDU—not shown) as described below. Likewise, the outboard devices 146 on the leading edge 118 and the trailing edge 120 may be coupled to an outboard torque tube 296 or other mechanical linkage for actuating the outboard devices 146. The inboard torque tube 294 at the trailing edge 120 may include a universal joint or similar mechanism to accommodate the geometry change in the wing trailing edge 120. Spoilers 290 may be mounted on the wing upper surface 122 (FIG. 3) and may partially overlap the forward edge of the trailing edge devices 240. Deployment of the spoilers 290 may act as speed brakes for decelerating the aircraft 100 during flight. The spoilers 290 may also reduce aerodynamic lift of the wings 116 during landing after touchdown or during a rejected take-off such that the weight of the aircraft 100 may be transferred to the landing gear for improved braking performance.

In FIG. 2, the variable camber system 300 may include a variable camber trim unit (VCTU) 302 that may be positioned between an inboard device 144 and an outboard device. For example, in the wing 116 embodiment shown in FIG. 2, a motorized VCTU 302 with a speed sum gearbox (not shown) may be located at the leading edge 118 of the aircraft wing 116 between the inboard slat 154 and the outboard slats 156. Likewise, a motorized VCTU 302 with a speed sum gearbox 320 (FIG. 19) may be located at the trailing edge 120 between the inboard flaperon 286 or inboard flaps 244 and the outboard flaps 246. One or more of the VCTUs 302 may cooperate with one or more PDUs 400 to provide dynamic adjustment of the leading edge devices 150 and trailing edge devices 240 to vary the wing camber such as along a chordwise direction and/or spanwise direction 136. Advantageously, the VCTUs 302 allow for differential motion between the inboard and outboard devices 144, 146 such that the outboard devices 146 may be driven independently of the inboard devices 144.

In FIG. 3, shown is a cross section of an embodiment of a wing 116 having a trailing edge device 240 configured as a flap 242 in a neutral or retracted position 158. Although shown as a simple flap 242 supported on a drop hinge 284, the flap 242 may be provided in any one of a variety of different trailing edge device configurations. For example, the flap 242 may be configured as a plain flap, a single-slotted flap, a multi-slotted Fowler flap, or any one of a variety of other flap configurations. The flap 242 may be actuated by a flap actuation system 280 using a trailing edge linkage assembly 282 that may be coupled to a torque tube 294, 296. The flap actuation system 280 may include a PDU 400 operating in conjunction with a VCTU 302. Deployment and retraction of the flap 242 may be effected by rotating the torque tube 294, 296 using the PDU 400 (FIG. 16) and/or VCTU 302 as described below.

In FIG. 3, shown is a leading edge device 150 configured as a slat 152 in a retracted position 158 on the fixed leading edge 118 of the wing 116. Although the leading edge device 150 is shown as a slat 152, the leading edge device 150 may be provided in any one of a variety of different configurations, for example a Krueger flap or other leading edge devices. The leading edge device 150 (e.g., slat 152) may be actuated by an actuation system. In some examples, the actuation system may be a slat actuation system 200 for actuating one or more slats 152. The one or more slats 152 may be supported by one or more carrier track assemblies 202. In the embodiment shown, the carrier track assembly 202 may include one or more arcuate guide tracks 204 which may be supported by one or more guide rollers 212 mounted to the wing structure. For example, each one of the slats 152 may be supported by a pair of guide tracks 204 protruding through a pair of openings 126 in the fixed leading edge 118 of the wing 116. Each one of the guide tracks 204 may include a track forward end 206 that may be coupled to be a corresponding pair of slat tabs 208 (FIG. 6) extending aftwardly from the slat 152. Deployment and retraction of the slat 152 may be effected by rotating a torque tube 294, 296 using the PDU 400 (FIG. 16) in conjunction with the VCTU 302. A pinion gear 210 may be mounted on the torque tube 294, 296 for engaging gear teeth (not shown) on the guide track 204 for deploying and retracting the slat 152.

In FIG. 4, shown is a cross section of the wing 116 illustrating the slat 152 and flap 242 extended in a high lift mode from a retracted position 158, 248 to a deployed position 160, 250 to increase the wing camber and improve the lift characteristics of the wing 116 such as at high angles of attack. For example, during takeoff and/or landing, the slat 152 may be deployed in a high lift mode by extending the slat 152 downwardly and forwardly from the wing leading edge 118 (FIG. 3) to a gapped position 184 such that an upper gap 180 (FIG. 6) exists between the slat upper edge 178 and the wing upper surface 122. The slat 152 may be retracted along an upwardly rearward direction. The slat 152 may also be deployed at a reduced setting to a sealed position 182 to close the upper gap 180 between the slat upper edge 178 and the wing upper surface 122. In the sealed position 182, the slat 152 may generate a reduced amount of aerodynamic drag which may improve the climb performance of the aircraft 100. In the sealed position 182, the slat 152 may generate a reduced amount of aerodynamic noise relative to aerodynamic noise generated by the slat 152 in the gapped position 184.

In FIG. 4, shown is the flap 242 extended from a refracted position 248 to one or more deployed positions 250 at one or more standard flap 242 settings in a high lift mode. In the embodiment shown, the flap settings may include UP, HOLD, CLB/APP, TOGA, and LAND. The UP flap setting 270 may correspond to a retracted position 158 for the slats 152 and a retracted position 248 for the flaps 242, and may be implemented when the aircraft 100 is in cruise mode. Advantageously, in the UP flap setting 270, the slats 152 and the flaps 242 may be dynamically adjusted upwardly and downwardly at small deflection angles 170, 260 in a variable camber mode 520 (FIG. 3) as described below.

In FIG. 4, the HOLD flap setting 272 may correspond to an extended position for the slats 152 at a sealed position 182, and a retracted position 248 for the flaps 242, and may be implemented when the aircraft 100 is in a holding pattern. The CLB/APP flap setting 274 may correspond to an extended position for the slats 152 to the sealed position 182, and an extended position for the flaps 242, and may be implemented when the aircraft 100 is in a climbing mode or when the aircraft 100 is in an approach configuration and is descending. The CLB/APP flap setting 274 may correspond to a flap setting of between Flaps 5 to Flaps 15 or more, depending upon the aircraft 100. The takeoff flap setting 276 (e.g., TOGA) may correspond to an extended position for the slats 152, and an extended position for the flaps 242, and may be implemented during takeoff. Depending upon the aircraft 100, the takeoff flap setting 276 may correspond to a flap setting of Flaps 20, although the takeoff flap setting 276 may correspond to a flap setting of anywhere between Flaps 5 to Flaps 20 or more. The LAND flap setting 278 may correspond to a gapped position 184 for the slats 152, and a further extension of the flaps 242, and may be implemented to place the aircraft 100 in a landing configuration. The LAND flap setting 278 may correspond to a relatively deep flap setting of Flaps 30 or more, depending upon the aircraft 100.

Figure 23:
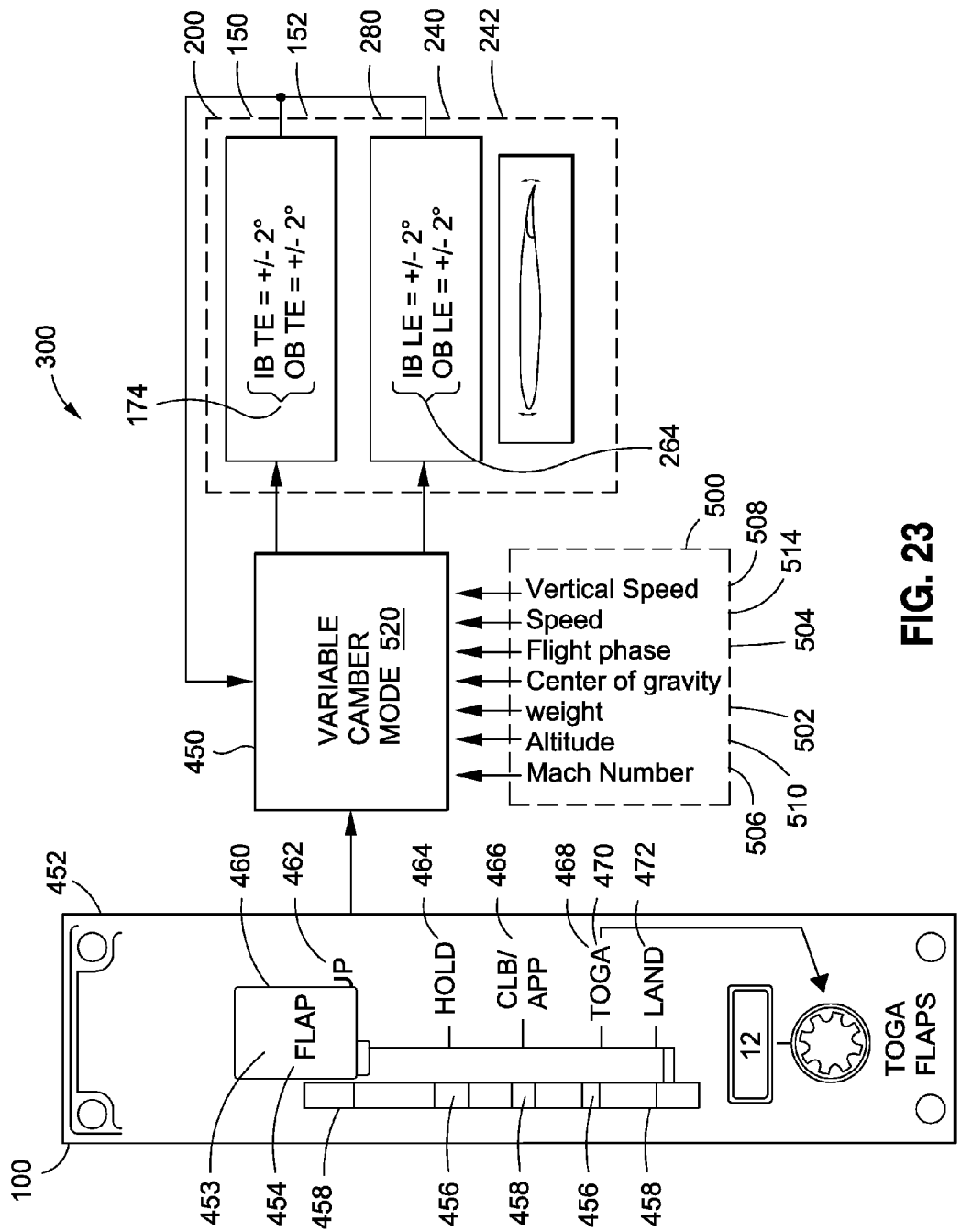
FIG. 23 is a diagrammatic view of an embodiment of a control system for controlling the slats and flaps in a variable camber mode when the control device in a cruise position, and illustrating a flight control computer determining an optimum slat setting and optimum flap setting.

In FIG. 5, shown is a cross section of the wing 116 illustrating the deployment of a slat 152 and a flap 242 in a variable camber mode 520 which may be implemented when a control device (e.g., a flap control lever 454—FIG. 23) is in a cruise position 462 (FIG. 23). When the control device is in the cruise position 462, the slat actuation system 200 may be automatically commanded to adjust the position of the slats 152 in relatively small slat deflection increments 172 in an upward direction 166 relative to the retracted position 158 (FIG. 4), and/or in relatively small slat deflection increments 172 in a downward direction 168 relative to the retracted position 158. In the variable camber mode 520, the slats 152 may be periodically repositioned within relatively small slat deflection angles 170 according to a predetermined slat deflection schedule. The slats 152 may be positioned at an optimum flap setting 264 to optimize the wing camber according to the predetermined slat deflection schedule which may be based on aircraft state data 500 (FIG. 23) such as aircraft gross weight 502, aircraft center of gravity 504, Mach number 506, altitude 510, and/or other aircraft parameters, as described in greater detail below. As indicated above, the variable camber system 300 (FIG. 4) may adjust the slats 152 and flaps 242 in relatively small deflection increments 172, 262 to alter the wing camber such as during cruise flight as a means to reduce aerodynamic drag and/or to optimize the distribution of lift along a spanwise direction 136 (FIG. 2) of the wings 116.

In FIG. 5, in the variable camber mode 520, the slat actuation system 200 may be configured such that slat 152 movement is limited to within a slat deflection angle 170 of less than approximately three (3) degrees in the upward direction 166 relative to a retracted position 158 (FIG. 4), and approximately three (3) degrees in the downward direction 168 relative to a retracted position 158 of the slat 152. In a further embodiment, slat 152 movement may be limited to within a slat deflection angle 170 of approximately two (2) degrees in each of the upward direction 166 and downward direction 168 relative to the retracted position 158. The slat deflection angle 170 may be defined as the angle between a local wing chord line 140 and a local slat chord line 176 (FIG. 10). In the present disclosure, the slat chord line 176 may extend through a forward-most point on the slat 152 when the slat 152 is in a retracted position 158. As will be understood, the retracted position 158 may correspond to a position in which the local slat chord line 176 is generally aligned with the local wing chord line 140 (e.g., a zero slat deflection angle 170). In FIG. 5, the flaps 242 are configured as simple flaps 242, and the flap deflection angle 260 may be defined as the angle between the local wing chord line 140 and a local flap chord line 266. The local flap chord line 266 may be aligned with the local wing chord line 140 when the flap 242 is in a retracted position 248. However, for multi-slotted flaps 242 or other non-simple flap configurations, the flap deflection angle may be measured by different means.

In FIG. 5, in the variable camber mode 520, the flap actuation system 280 may be automatically commanded to adjust the position of the flaps 242 in relatively small flap deflection increments 262 along an upward direction 256 to an upward position 252 relative to the retracted position 248, and/or in relatively small flap deflection increments 262 along a downward direction 258 to a downward position 254 relative to the retracted position 248. In the variable camber mode 520, the flaps 242 may be periodically repositioned within relatively small flap deflection angles 260 according to a predetermined flap deflection schedule. In an embodiment, the flap actuation system 280 may be configured such that flap 242 movement is limited to within a flap deflection angle 260 of less than approximately three (3) degrees in each of the upward direction 256 and downward direction 258 relative to the retracted position 248 or neutral position of the flap 242. In the variable camber mode 520, the slats 152 and flaps 242 may be deployed in conjunction with one another according to a slat and flap deflection schedule to optimize the aerodynamics of the wing 116 for aerodynamic drag reduction and/or to optimize the spanwise load distribution.

FIG. 6 shows a partial cross section of the wing 116 showing a slat 152 in a retracted position 158 on the fixed leading edge 118 of the wing 116. In an embodiment, the slat 152 may be supported by one or more carrier track assemblies 202. Each carrier track assembly 202 may include the arcuate guide track 204 having a track forward end 206 extending through an opening 126 in a leading edge 118 of the wing 116 and fixedly coupled to a slat tab 208 extending aftwardly from the slat 152. Each guide track 204 may be driven by a pinion gear 210 fixedly mounted on a torque tube 294, 296 and configured to engage the guide track 204. In the embodiment shown, the slat 152 may move in an upward direction and/or an upwardly rearward direction 166 (see e.g., FIGS. 5 and 10) and a downward direction and/or downwardly forward direction 168 (see e.g., FIGS. 5 and 11) relative to a retracted position 158 (see also FIG. 5). In some examples, the slat 152 may be supported by an alternative mechanism and/or may be configured for upward movement and downward movement of the slat 152 or other movements different than the specific examples depicted in FIGS. 5, 10 and 11.

In FIG. 6, shown is a seal coupled to a lower edge of the slat 152 and extending toward a lower surface 124 of the wing 116. The seal may be configured to maintain contact with the lower surface 124 of the wing 116 when the slat 152 is moved in the upward direction 166 and/or a downward direction 168 relative to the retracted position 158. In an embodiment, the seal may be configured as a slat inner seal 214. The slat inner seal 214 may be mounted between the slat inner side 188 and the fixed leading edge 118 of the wing 116 to seal an inner gap therebetween. The slat inner seal 214 may maintain sealing engagement with the slat inner side 188 and the fixed leading edge 118 when the slat 152 is moved in an upward direction 166 and/or a downward direction 168 (e.g., as shown in FIGS. 5, 10, and 11). In an embodiment, the slat inner seal 214 may be configured as a bulb seal 216 having a hollow cylindrical bulb portion 218 and a flange portion 220 extending from the bulb portion 218 for attaching the bulb seal 216 to the slat 152. The slat inner seal 214 may minimize or prevent aerodynamic losses that may otherwise occur due to excessive airflow between the slat 152 and the fixed leading edge 118 of the wing 116.

In FIG. 7, shown is an enlarged partial view of an embodiment of a slat seal. The slat seal (e.g. a slat lower seal 222) that may be configured for sealing a lower gap 190 (FIG. 6) between the slat lower edge 186 (FIG. 6) and the wing lower surface 124 (FIG. 6). The slat lower seal 222 may be configured as a flexible member having a seal forward end 224 coupled to the slat lower edge 186, and extending aftwardly to and terminating at a seal aft end 226. The seal forward end 224 may be fixedly attached the slat lower edge 186 using mechanical fasteners, adhesive bonding or other fastening techniques currently known or later developed. The slat lower seal 222 may be configured such that the seal aft end 226 is maintained in contact with the wing lower surface 124 when the slat 152 is moved within the slat deflection angle 170 (FIGS. 10-11) between the upward position 162 (FIG. 10) and the downward position 164 (FIG. 11) when the slat 152 is operated in the variable camber mode 520 (FIGS. 10-11). The slat lower seal 222 may advantageously minimize or prevent aerodynamic losses that may otherwise occur due to airflow between the slat 152 and the fixed leading edge 118 of the wing 116.

In FIG. 8, shown is an enlarged partial view of an embodiment of the slat lower seal 222 following extension of the slat in an upward direction (partial view of slat shown in dashed line). In an embodiment, the slat lower seal 222 may be implemented as a plate member formed of resilient material (e.g., spring steel) curved in a forward-aft direction. By virtue of its curvature, the slat lower seal 222 may be biased against the lower surface 124 of the wing such that the seal aft end 226 remains in substantially continuous contact with the wing lower surface 124 when the slat 152 is deflected in the upward direction 166 and/or the downward direction 168 (e.g., as shown in FIGS. 5, 10, and 11).

In FIG. 9, shown is a perspective view of an underside of a wing leading edge 118 illustrating the installation of an embodiment of the slat lower seal 222 for sealing the lower gap 190 between the slat lower edge 186 (FIG. 6) and the wing lower surface 124 (FIG. 6). In the embodiment shown, the slat lower seal 222 may include one or more seal skirts 228 and one or more seal doors 230. A seal door 230 may be positioned at a location of an opening 126 in the wing leading edge 118 for a guide track 204 (FIG. 5). The seal skirts 228 may be formed as an elongated member that may extend along a spanwise direction 136 of the slat 152 between the seal doors 230, which may be located at each opening 126. As indicated above, the seal skirt 228 may have a seal forward end 224 and a seal aft end 226. The seal forward end 224 may be fixedly coupled to the slat lower edge 186. The seal skirt 228 may be configured as a resiliently flexible member configured to bias the seal aft end 226 upwardly against the wing lower surface 124 when the slat 152 is deflected upwardly and downwardly in the variable camber mode 520 (FIG. 5).

In FIG. 9, the seal door 230 may have a longer length in the forward-aft direction than the seal skirts 228 such that the seal door 230 may cover the opening 126 in the wing leading edge 118 for the guide track 204 (FIG. 6). The flexible seal door 230 may have a seal forward end 224 (FIG. 9) fixedly coupled to the slat lower edge 186 (FIG. 6), and a seal aft end 226 (FIG. 9) configured to maintain contact with the wing lower surface 124. Similarly to a seal skirt 228, the seal door 230 may be resiliently flexible in a vertical direction such that when the slat 152 is deflected upwardly and/or downwardly, the seal aft end 226 of the seal door 230 may remain in contact with the wing lower surface 124 (FIGS. 10-11) to cover the opening 126 in the wing leading edge 118. In this manner, the seal skirt 228 and seal doors 230 may be configured to maintain continuity of airflow over the slat 152 underside and wing lower surface 124, and thereby minimize aerodynamic losses.

In FIG. 10, shown is the wing leading edge 118 illustrating the slat 152 actuated in an upward direction 166 relative to the retracted position 158 of the slat 152. In the variable camber mode 520 (FIG. 5), the slat 152 may move within a slat deflection angle 170 along an upwardly rearward direction relative to the retracted position 158. The slat lower seal 222 may advantageously maintain aerodynamic sealing of the slat 152 with the wing lower surface 124. The slat inner seal 214 may advantageously maintain aerodynamic sealing of the slat upper edge 178 with the wing upper surface 122. As indicated above, when operated in the variable camber mode 520 when the control device 453 (FIG. 23) is in the cruise position 462 (FIG. 23), the slat actuation system 200 may be configured such that slat 152 movement may be limited to within a slat deflection angle 170 of less than approximately three (3) degrees in the upward direction 166 relative to a retracted position 158.

In FIG. 10, the slat actuation system 200 (FIG. 11) may be configured to actuate one or more leading edges devices 150 (e.g., one or more slats 152) in relatively small slat deflection increments 172 such as when the slat 152 is moved within the allowable slat deflection angle 170 for the variable camber mode 520 (FIG. 5). For example, the slat actuation system 200 may be configured to actuate the slat 152 in an upward direction 166 and/or a downward direction 164 in slat deflection increments 172 of less than approximately two (2) degrees, and preferably within slat deflection increments 172 of less than approximately one degree, and more preferably within a slat deflection increment 172 of approximately 0.3 degrees or less. Such a relatively small slat deflection increment 172 allows for positioning the slats 152 at or near a setting computed by a flight control computer 450 (FIG. 23). In some examples, the setting may correspond to movement of the leading edge device 150 to within a deflection angle 170 of less than approximately three (3) degrees in the upward direction 166 and/or a downward direction 168 relative to the retracted position 158 if the control device 453 (FIG. 23) is in the cruise position 462 (FIG. 23). The setting may be an optimum slat setting 174 determined by the flight control computer 450 based on pre-programmed, current, and/or real-time aircraft state data 500 (FIG. 23), as described in greater detail below.

In FIG. 11, shown is the wing leading edge 118 with the slat 152 actuated in a downward direction 168 relative to the retracted position 158. The slat actuation system 200 may actuate the slat 152 in relatively small slat deflection increments 172 when the slat 152 is moved in the downward direction 168 within the allowable slat deflection angle 170.

The system 300 may be configured to allow for positioning slats 152 or other leading edge devices 150 in a downward direction 168 at or near a setting computed by the flight control computer 450 (FIG. 23) such as at an optimum slat setting 174 determined by the flight control computer 450. The slat actuation system 200 may actuate the slat 152 in the downward direction 168 in slat deflection increments 172 of less than approximately two (2) degrees, and preferably within slat deflection increments 172 of less than approximately one degree, and more preferably within a slat deflection increment 172 of approximately 0.3 degrees or less. The slat lower seal 222 advantageously maintains aerodynamic sealing with the wing lower surface 124, and the slat inner seal 214 maintains aerodynamic sealing with the wing upper surface 122. The slat actuation system 200 may actuate the slat 152 in the downward direction 168 in the same or substantially similar slat deflection increments 172 as described above with regard to movement of the slat 152 in the upward direction 166 relative to the retracted position 158.

Figure 16:
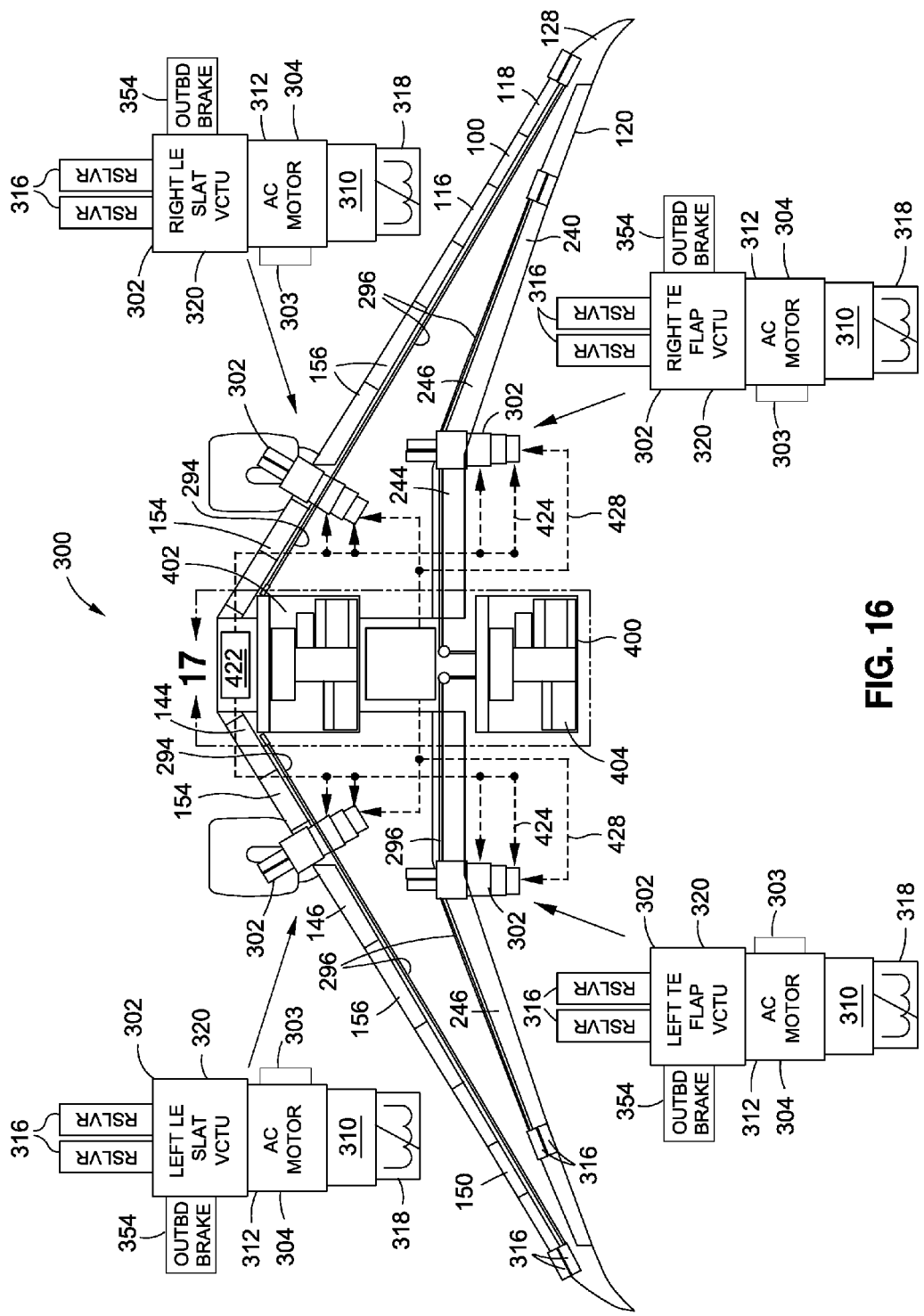
FIG. 16 is a diagrammatic plan view of a variable camber system incorporating a VCTU between the inboard and outboard slats and between the inboard and outboard flaps on the each wing.

In FIG. 12, shown is a diagrammatic view of a wing leading edge 118 and schematically illustrating a variable camber trim unit (VCTU) positioned between an inboard slat 154 and an outboard slat 156 mounted to the wing leading edge 118. As indicated above, one or more of the inboard slats 154 may be coupled to an inboard torque tube 294 such as by means of a pinion gear 210 engaging a guide track 204 of a carrier track assembly 202 as shown in FIG. 6. Likewise, one or more outboard slats 156 may be coupled to an outboard torque tube 296 by means of the trailing edge linkage assembly 282 (FIG. 5). A similar arrangement may be provided for coupling the inboard flap 244 (FIG. 2) and the outboard flap 246 (FIG. 2) to the respective inboard torque tube 294 (FIG. 6) and outboard torque tube 296 (FIG. 6) at the trailing edge 120 (FIG. 5) of the wing 116 (FIG. 5). The VCTU 302 may include a dedicated VCTU electric motor 304 that may be operated in conjunction with a speed sum gearbox 320 and may further include an outboard brake 354. The inboard slat 154 and the inboard flap 244 (FIG. 2) may be driven by a central motor 406 (FIG. 16) of a respective leading edge PDU 402 (FIG. 16) and a trailing edge PDU 404 (FIG. 16). Advantageously, the VCTU electric motor 304 and speed sum gearbox 320 may be configured as an integrated unit that may be operated in conjunction with the PDUs 400 (FIG. 16) for actuating the outboard slats 156 and flaps 242 (FIG. 2) relative to the inboard slats 154 and flaps 242.

In FIG. 13, shown is a diagrammatic view of the wing leading edge 118 of FIG. 13 and illustrating the operation of the VCTU 302 in conjunction with the PDU 400 to actuate the outboard slat 156 and the inboard slat 154 in unison. As described in greater detail below, the power-off brake 310 of the VCTU 302 may be applied to prevent rotational movement of the VCTU electric motor 304. The central motor 406 (FIG. 16) of the leading edge PDU 402 (FIG. 16) may be activated for actuating the inboard slat 154. With the power-off brake 310 applied, actuation of the inboard slat 154 by the central motor 406 rotates the inboard torque tube 294. When the power-off brake 310 is applied, the rotational movement of the inboard torque tube 294 is transferred through the speed sum gearbox 320 (FIG. 13) to the outboard torque tube 296 resulting in actuation of the inboard slat 154 and the outboard slat 156 in unison.

In FIG. 14, shown is a diagrammatic view of the wing leading edge 118 of FIG. 13 and illustrating the actuation of the inboard slat 154 independently of the outboard slat 156. As described in greater detail below, for independent actuation of the inboard slat 154, the power-off brake 310 of the VCTU electric motor 304 is released. The outboard brake 354 of the VCTU 302 is applied to prevent rotation of the outboard slat 156. The central motor 406 (FIG. 16) of the leading edge PDU 402 (FIG. 16) is activated resulting in rotation of the inboard torque tube 294. The speed sum gearbox 320 is configured such that rotation of the inboard torque tube 294 causes the VCTU electric motor 304 to be back-driven while the inboard slat 154 is actuated by the central motor 406 of the leading edge PDU 402.

In FIG. 15, shown is a diagrammatic view of the wing leading edge 118 of FIG. 13 and illustrating the actuation of the outboard slat 156 independently of the inboard slat 154. For independent actuation of the outboard slat 156, the central motor 406 (FIG. 16) of the leading edge PDU 402 (FIG. 16) is prevented from rotating the inboard device 144 by applying a central brake 414 (FIG. 16) which may be coupled to the central motor 406. The outboard brake 354 of the VCTU 302 is released. Additionally, the power-off brake 310 of the VCTU electric motor 304 is released. The VCTU electric motor 304 is then activated causing rotation of the outboard torque tube 296 and resulting in actuation of the outboard slat 156 independently of the inboard slat 154. In an embodiment, the movement of the outboard slat 156 may be limited to avoid exceeding a predetermined maximum inboard-outboard slat split limit (not shown). The slat split limit may represent a maximum allowable difference in deployment positions of the inboard slat 154 relative to the outboard slat 156.

As is schematically illustrated in FIGS. 12-15, the VCTU 302 advantageously provides a means for driving the outboard slats 156 independently of the inboard slat 154. The above-described system for actuating the outboard slats 156 and inboard slats 154 independently of one another may be applied in a similar manner to the outboard flaps 246 and the inboard flaps 244 or to other trailing edge devices 240 such as ailerons 288 and flaperons 286. In this regard, the VCTU 302 provides a means for actuating the outboard devices 146 independently of the inboard device 144 in a simplified manner relative to conventional clutch-based systems which may require a relatively large quantity of discrete movements for positioning the inboard devices 144 and outboard devices 146 at target variable camber positions. The VCTU 302 as disclosed herein simplifies asymmetric outboard slat and flap movements, and improves the feasibility of differential deployment of the inboard and outboard devices which may be desirable during one or more phases of flight such as during takeoff, climb, cruise, descent, approach, and landing, as described in greater detail below.

In FIG. 16, shown is a diagrammatic view of the variable camber system 300 incorporating VCTUs 302 between the inboard slats 154 and outboard slats 156 on the leading edge 118 of each wing 116, and incorporating VCTUs 302 between the inboard flaps 244 and the outboard flaps 246 or flaperons 286 on the trailing edge 120 of each wing 116. As indicated above, each VCTU 302 may be operated in conjunction with a centrally-located PDU 400. For example, the leading edge PDU 402 may be coupled to the inboard slats 154 on opposite sides of the fuselage 102 (FIG. 2), and the trailing edge 120 may be coupled to the inboard flaps 244 on opposite sides of the fuselage 102. The variable camber system 300 including the PDUs 400 and VCTUs 302 may be controlled by flight control electronics 422 which may centrally-located such as adjacent to the PDUs 400.

In FIG. 16, the flight control electronics 422 may be configured to generate command signals representative of target variable camber positions for the inboard and outboard slats 154, 156 and flaps 244, 246 and other leading edge devices 150 and trailing edge devices 240. The command signals may be transmitted from the flight control electronics 422 along one or more command lines 424, or the command signals may be wirelessly transmitted to the PDUs 400 and to motor controllers 303 of each VCTU 302. In this regard, each VCTU 302 may include a motor controller 303 for controlling the VCTU electric motor 304, the outboard brake 354, and/or the power-off brake 310 of the VCTU 302. Such command signals transmitted to the leading edge PDU 402 and VCTUs 302 may allow for actuation of the inboard and outboard slats 154, 156 according to a minimum slat deflection increment 172 (FIG. 12). Likewise, command signals transmitted to the trailing edge PDU 404 and VCTUs 302 may allow for actuation of the inboard and outboard flaps 244, 246 according to the minimum flap deflection increment 262 (FIG. 5). The flight control electronics 422 may receive position signals from position sensors 312 (not shown) that may be included with each one of the VCTUs 302. The position signals generated by the position sensors 312 may represent the current position of the inboard device 144 or outboard device 146 that is being actuated by the VCTU.

In FIG. 16, the variable camber system 300 disclosed herein may further include a central power supply 426 for powering the VCTU electric motor 304 of each one of the VCTUs 302. The power supply 426 may be centrally-located such as near the PDUs 400. In an embodiment, the motor controller 303 of each one of the VCTU electric motors 304 may be provided with a substantially continuous supply of relatively low-voltage power from the central power supply 426 (FIG. 17) for periods when the VCTU 302 is non-actuated. Relatively high-voltage power may be provided to the VCTU electric motors 304 from the central power supply 426 via an electric supply line 428. The relatively high-voltage power may cause the VCTU electric motor 304 to rotate in response to a command signal transmitted from the flight control electronics 422 to the motor controller 303.

In FIG. 16, each one of the VCTUs 302 may include the above-mentioned VCTU electric motor 304 and speed sum gearbox 320. Each VCTU 302 may also include an outboard brake 354 to prevent rotation of the outboard device 146. Each VCTU 302 may additionally include the power-off brake 310 which may be applied to prevent rotation of the VCTU electric motor 304. The motor controllers 303 may receive power from the centrally-located central power supply 426 via the electric supply lines 428. Such power may be provided the coils 318 of the power-off brake 310 in response to a command signal received from the flight control electronics 422. The variable camber system 300 may include one or more resolvers 316 positioned at different locations on the leading edge 118 and trailing edge 120 of the wing 116. Signals representing the positions of the leading edge devices 150 and trailing edge devices 240 may be provided to the flight control electronics 422.

Figure 17:
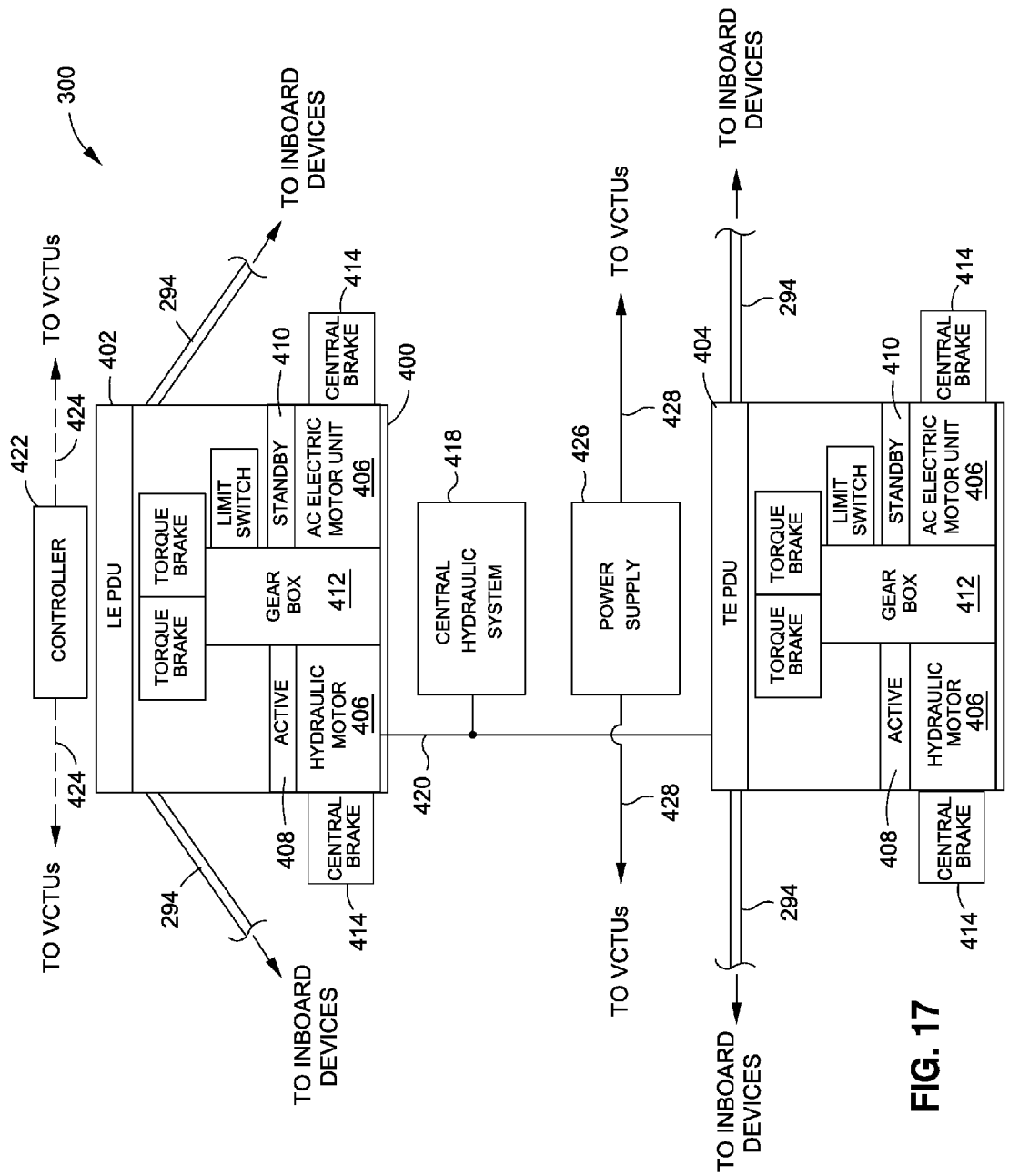
FIG. 17 is a diagrammatic view of a center portion of the variable camber system of FIG. 16 and illustrating a leading edge power drive unit (PDU) for driving the inboard slats and a trailing edge PDU for driving the inboard flaps.

In FIG. 17, shown is a diagrammatic view of the center portion of the variable camber system 300 containing the leading edge PDU 402 and the trailing edge PDU 404. As indicated above, the leading edge slats 152 (FIG. 17) may be coupled to the inboard torque tube 294 on the leading edge 118 (FIG. 17) of the wing 116 (FIG. 17). The trailing edge flaps 242 may be coupled to the inboard torque tube 294 on the trailing edge 120 (FIG. 17) of the wing 116. As indicated above, each one of the PDUs 400 may include one or more central motors 406 including an active motor 408 and a backup motor 410. Each one of the central motors 406 may include a central brake 414 configured as a power-off brake for preventing rotation of the central motor 406 and thereby preventing actuation of the inboard device 144 (FIG. 17) to which the central motor 406 is coupled.

In FIG. 17, in an embodiment, the active motor 408 and/or the backup motor 410 may be configured as a hydraulic motor or an electrohydraulic actuator coupled to a central hydraulic system 418 via one or more hydraulic lines 420, and may be configured to drive the inboard devices 144. The active motor 408 and/or the backup motor 410 may optionally be configured as an electric motor or electromechanical actuator for driving the inboard devices 144. The leading edge PDU 402 and the trailing edge PDU 404 may each include a central gearbox 412 and one or more central brakes 414. The central brakes 414 (e.g., power-off brakes) may prevent movement of the inboard devices 144 when the central brakes 414 are applied.

Figure 18:
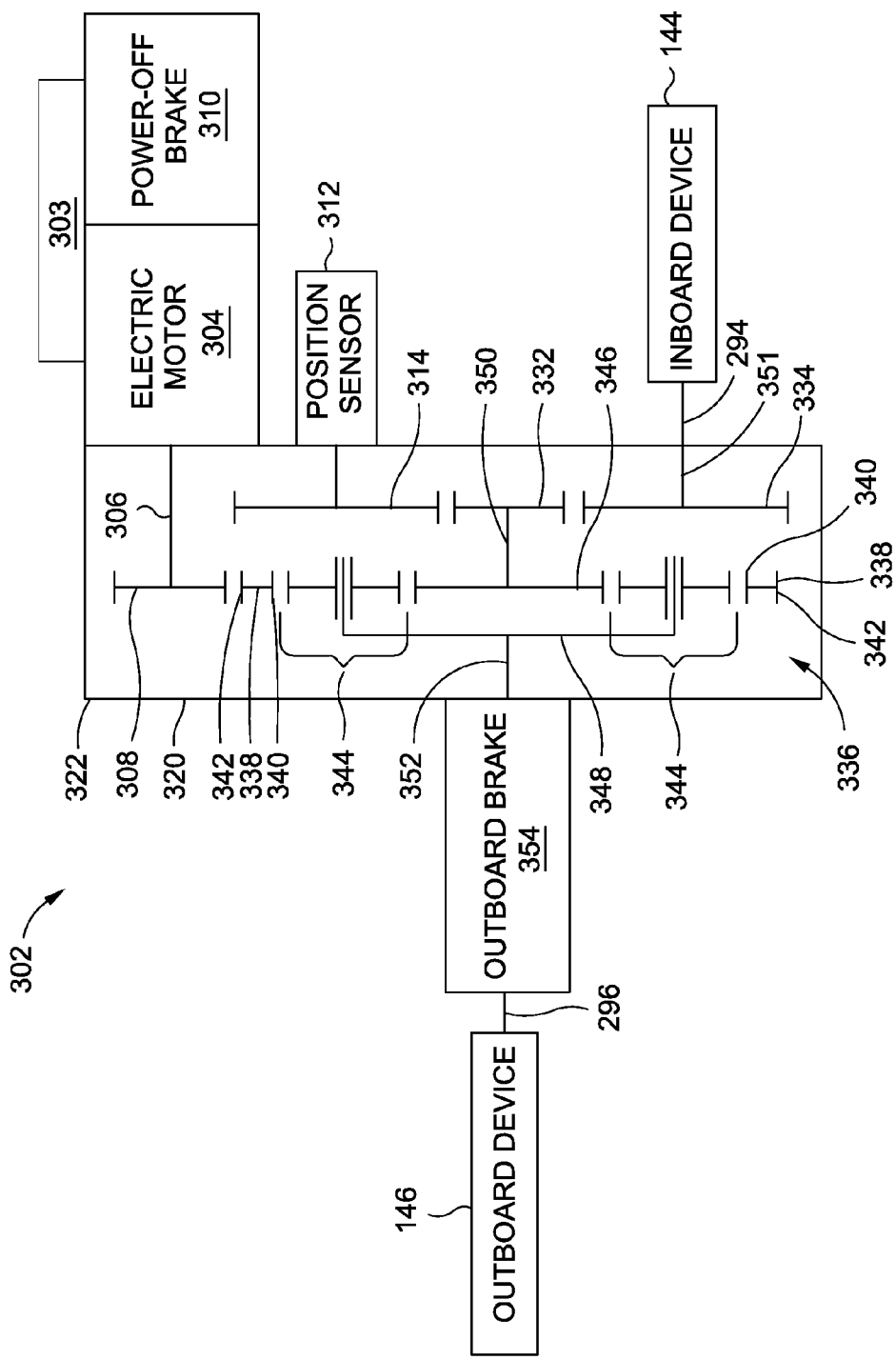
FIG. 18 is a schematic diagram of a VCTU including a speed sum gearbox having an outboard brake and a VCTU electric motor.

In FIG. 18, shown is a schematic illustration of the components that make up the VCTU 302 including the VCTU electric motor 304, the power-off brake 310, the position sensor 312, the speed sum gearbox 320, and the outboard brake 354. The speed sum gearbox 320 may include an inboard shaft 351 that may be coupled to the inboard device 144 (e.g., inboard slat 154 or inboard flap 244—FIG. 17) via the inboard torque tube 294. The speed sum gearbox 320 may also include an outboard shaft 352 that may be coupled to the outboard device 146 (e.g., outboard slat 156 or outboard flap 246—FIG. 17) via the outboard torque tube 296. The VCTU electric motor 304 may include a motor shaft 306 having a motor pinion 308 that may be engaged to a ring gear 338 of the speed sum gearbox 320.

In FIG. 18, the speed sum gearbox 320 may be configured such that if one of the three shafts (e.g., the inboard shaft 351, the outboard shaft 352, the motor shaft 306) is held stationary and prevented from rotating, the remaining pair of shafts will rotate under the driving force of one of the remaining shafts of the pair. For example, if the inboard shaft 351 is prevented from rotating due to application of the central brake 414 (FIG. 17) of the PDU 400 (FIG. 17), then rotation of the motor shaft 306 will cause rotation of the outboard shaft 352 resulting in actuation of the outboard device 146 independent of the inboard device 144. If the motor shaft 306 is prevented from being rotated due to the application of the power-off brake 310, then rotation of the inboard shaft 351 will cause rotation of the outboard shaft 352 resulting in actuation of the inboard and outboard device 144, 146 in unison with one another. If the outboard shaft 352 is prevented from rotating due to application of the outboard brake 354, then rotation of the inboard shaft 351 by the central motor 406 will cause the VCTU electric motor 304 to be back-driven while the inboard device 144 is actuated and the outboard device 146 is stationary.

In FIG. 18, the inboard shaft 351 may be fixedly coupled to the inboard device 144 via the inboard torque tube 294. The outboard shaft 352 may be fixedly coupled to the outboard device 146 be the outboard torque tube 296. The inboard shaft 351 may include an inboard pinion 334 that may be coupled to an inboard gear 332. The VCTU 302 may include a position sensor 312 having a position sensor gear 314 engaged to the inboard gear 332 for sensing a position of the inboard device 144 and transmitting a representative position signal to the flight control electronics 422. The inboard gear 332 may be mounted on or fixedly coupled to a sun gear shaft 350 of the sun gear 346 of the speed sum gearbox 320. The speed sum gearbox 320 may include a plurality of planet gears 344 that may be supported on a carrier 348. The carrier 348 may be fixedly coupled to the outboard shaft 352. The planet gears 344 may encircle the sun gear 346 and may be engaged to the sun gear 346. The plurality of planet gears 344 may be circumscribed by a ring gear 338. The motor pinion 308 may be engaged to an external side 342 the ring gear 338.

Figure 19:
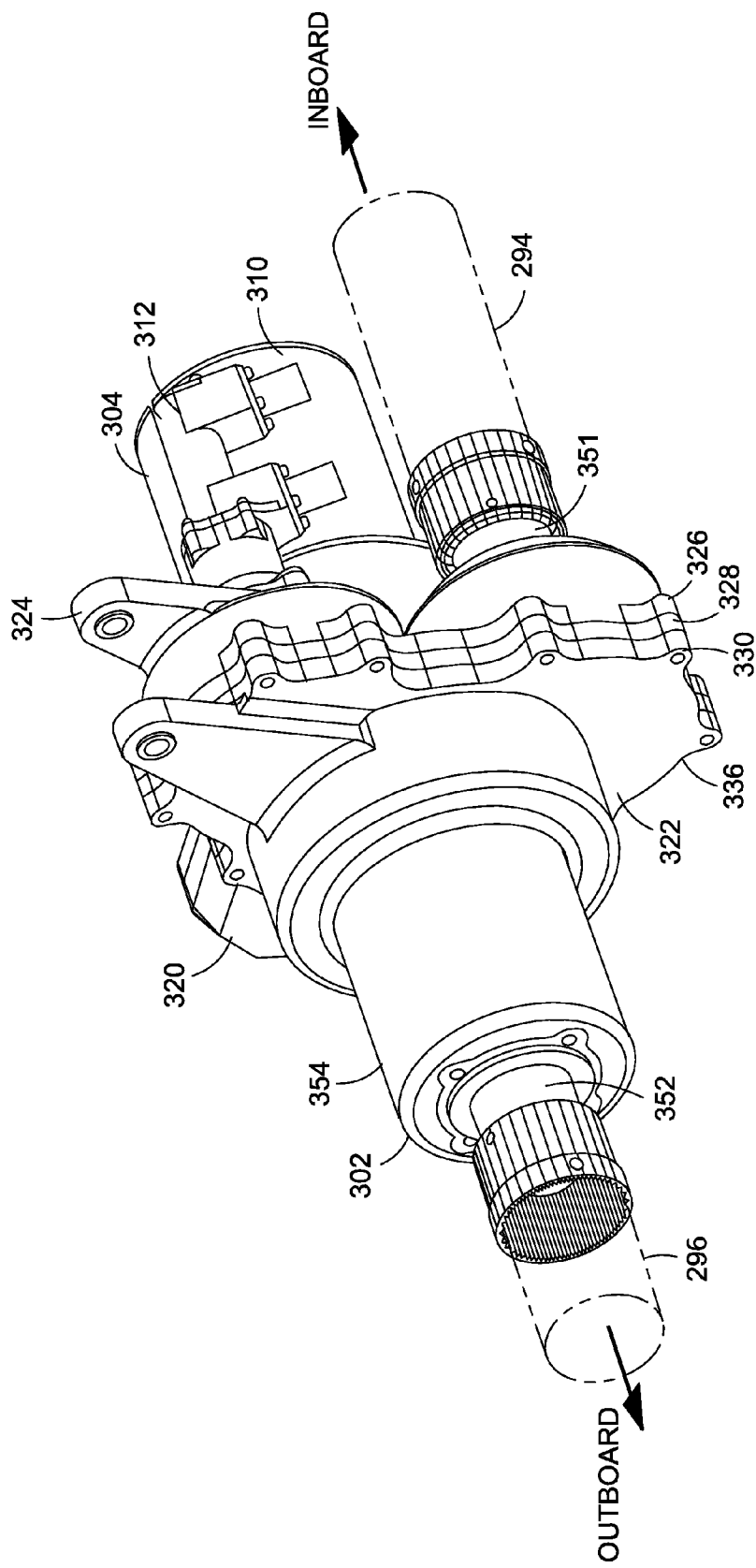
FIG. 19 is a perspective illustration of an embodiment of a VCTU.

In FIG. 19, shown is a perspective illustration of an embodiment of the VCTU 302 showing the inboard torque tube 294 coupled to the inboard shaft 351 of the speed sum gearbox 320, and further showing the outboard torque tube 296 coupled to the outboard shaft 352 of the speed sum gearbox 320. The VCTU 302 may be provided as an integrated unit including the VCTU electric motor 304 and the associated power-off brake 310, outboard brake 354, and position sensor 312, all of which may be supported by or contained within a VCTU housing 322. The VCTU housing 322 may include one or more mounting tabs 324 for mounting the VCTU 302 to the wing structure on the leading edge 118 (FIG. 17) and/or or trailing edge 120 (FIG. 17) of the wing 116 (FIG. 17).

Figure 20:
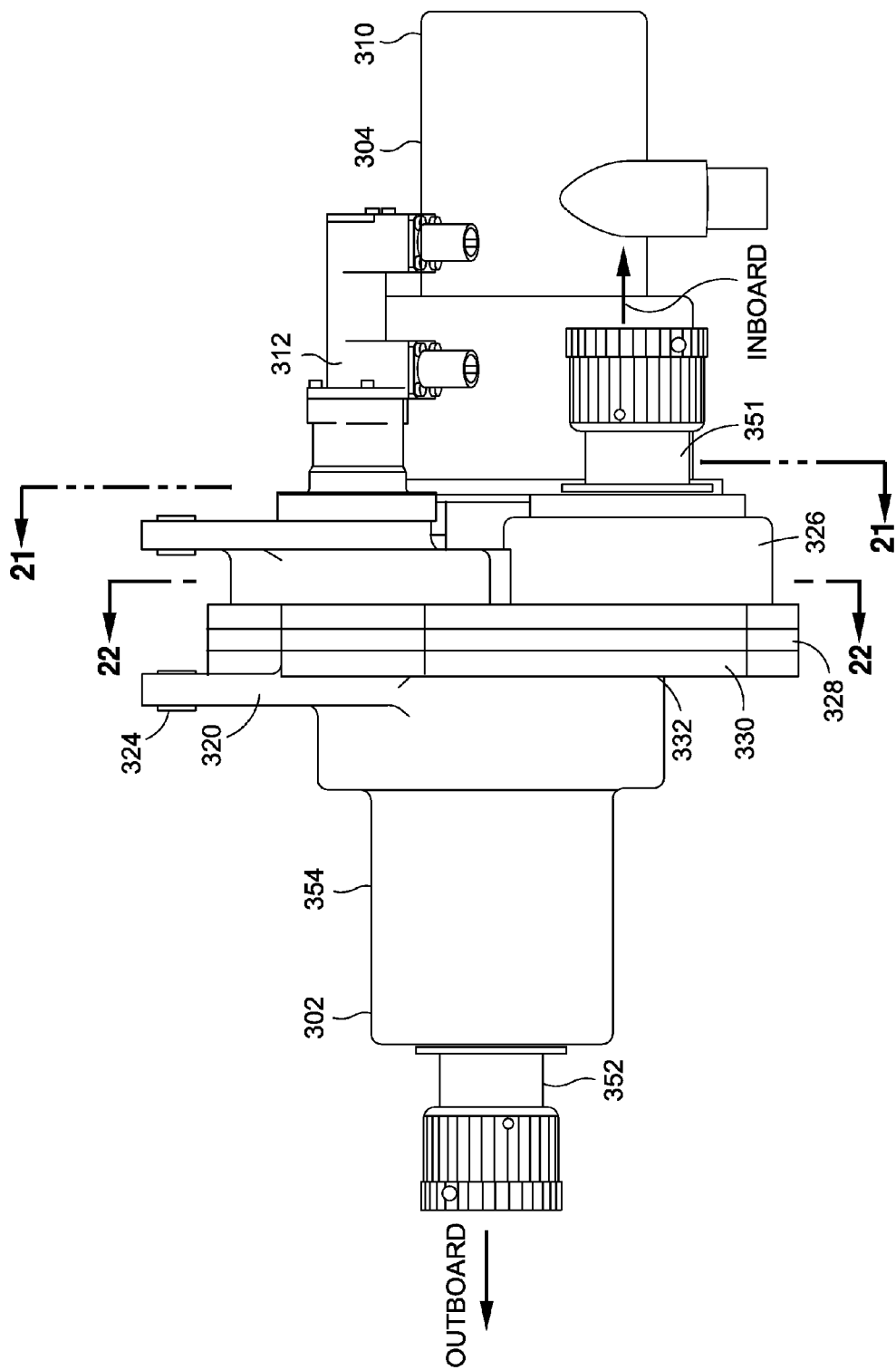
FIG. 20 is a forward-looking view of an aft side of the VCTU.

In FIG. 20, shown is a view looking forward at the VCTU 302 and illustrating the VCTU housing 322 formed in a three-piece arrangement including an inner housing 326 on the inboard side the VCTU 302, an outer housing 330 on an outboard side of the VCTU 302, and a mid housing 328 sandwiched between the inner housing 326 and the outer housing 330. The inner housing 326, the mid housing 328, and the outer housing 330 may be mechanically coupled together such as with mechanical fasteners or via other coupling means. The three-piece arrangement of the VCTU housing 322 may facilitate assembly and disassembly of the VCTU 302 such as for maintenance and inspection. Although not shown, each VCTU 302 and may include a seal extending around a perimeter at the interface of the outer housing 330, mid housing 328, and inner housing 326 for sealing the interior from the elements.

Figure 21:
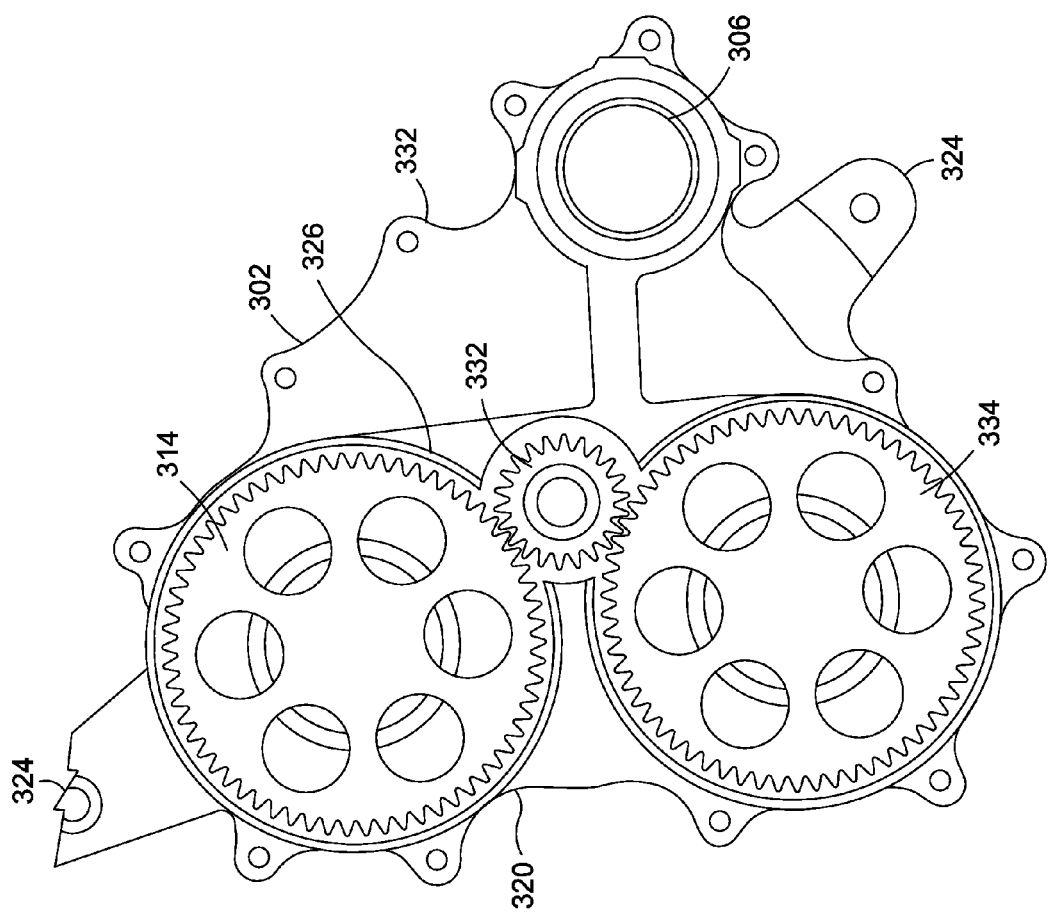
FIG. 21 is a sectional view of the VCTU taken along line 21 of FIG. 20 and illustrating the interconnectivity of an inboard pinion, an inboard gear, and a position sensor gear.

In FIG. 21, shown is a sectional view of the VCTU 302 showing the inboard pinion 334 and position sensor gear 314 operatively engaged to one another by the inboard gear 332. In an embodiment of the VCTU 302, the inboard gear 332 may be omitted, and the inboard shaft 351 may be directly coupled to the sun gear 346 of the speed sum gearbox 320. In such an arrangement, the position sensor gear 314 may be operatively coupled to the inboard shaft 351 to allow the position sensor 312 to sense the position of the inboard device 144 and transmit a representative position signal to the flight control electronics 422.

Figure 22:
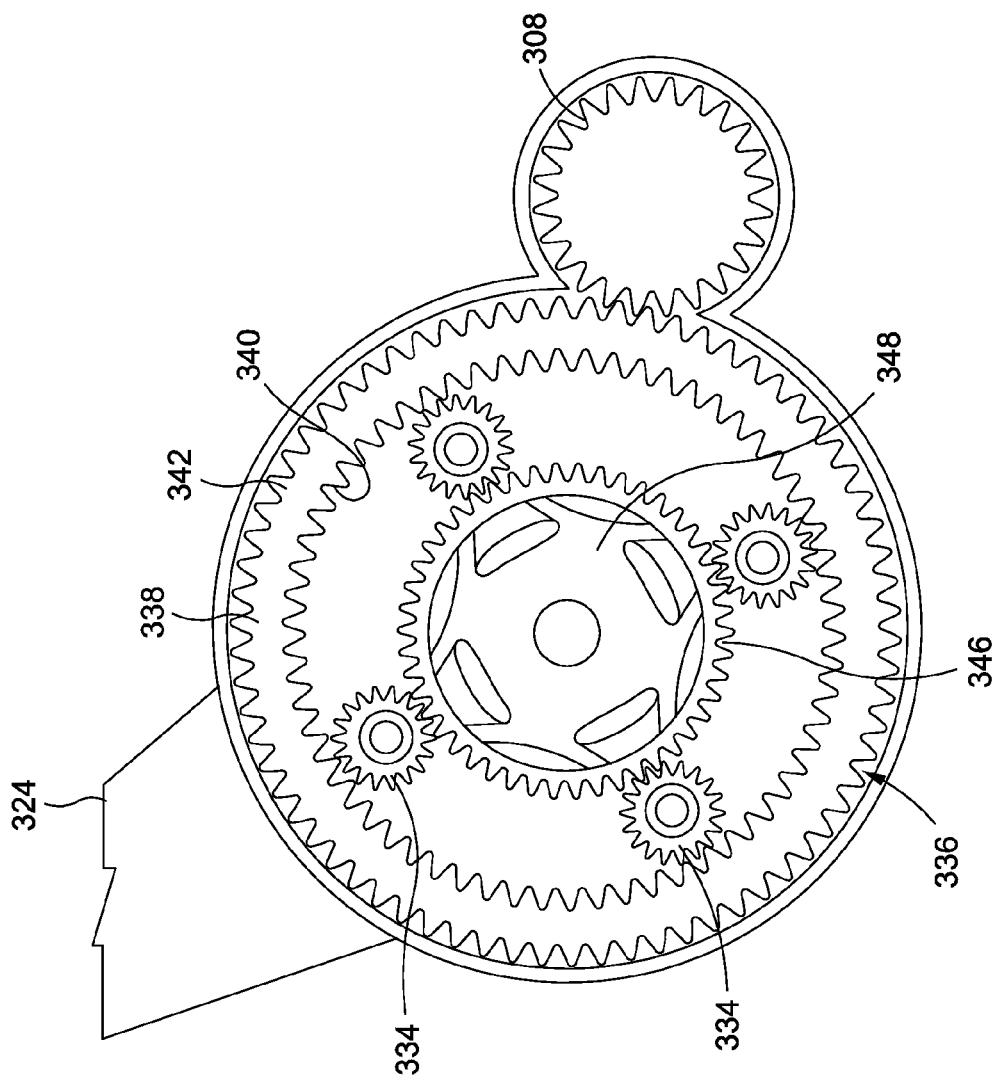
FIG. 22 is a sectional view of the VCTU taken along line 22 of FIG. 20 and illustrating the interconnectivity of a planetary gear system and the outboard brake.

In FIG. 22, shown is a sectional view of the VCTU 302 illustrating the speed sum gearbox 320 configured as a planetary gear system 336. As described above, the speed sum gearbox 320 may include a central sun gear 346 having gear teeth and which may be surrounded by a plurality of planet gears 344. The planet gears 344 may be supported on the carrier 348 which may be fixedly mounted to the outboard shaft 352. The gear teeth of the planet gears 344 may be engaged to the gear teeth on an internal side 340 of the ring gear 338 which circumscribes the planet gears 344. The motor pinion 308 of the VCTU electric motor 304 may be engaged to the external side 342 of the ring gear 338.

In FIG. 23, shown is a diagrammatic view of the system 300 (e.g., a variable camber system 300) including a control system 452 for controlling one or more leading edge devices 150 (e.g., one or more slats 152 or other device configurations) and one or more trailing edge devices 240 (e.g., one or more flaps 242 or other device configurations). The control system 452 may be operable to select a designated control device position 460 from a plurality of control device positions 458. In an embodiment, the control system 452 may include a control device 453 which may be integrated into a flight control system 452 of the aircraft 100 and which may be mounted on a console or control stand of a flight deck. The control device 453 may include a plurality of control device positions 458 corresponding to flap 242 settings and may include a flap control lever 454 that may be movable along a forward-and-aft direction. The flap control lever 454 may be positionable at one or more flap lever positions corresponding to flap settings. However, the control device 453 may be provided in any embodiment for manipulating the slats 152 and flaps 242, and is not limited to a flap control lever 454. The control device 453 may include one or more mechanical gates 456 configured to prevent movement of the flap control lever 454 until the flap control lever 454 is lifted, depressed, or otherwise manipulated to move the flap control lever 454 past the mechanical date as a means to prevent inadvertent retraction of the flaps 242.

In FIG. 23, the control device 453 may include a plurality of control device positions 458 including at least one designated control device position 460. In the embodiment shown, the control device positions 458 may include a cruise position 462 designated by UP (not shown), a hold position 464 designated as HOLD, a climb position or approach position 466 designated as CLB/APP, a take-off position 468 designated as TOGA, and a landing position 472 designated as LAND. However, the control device positions 458 may be designated by different nomenclature and are not limited to the illustrated designations. For example, the control device positions 458 may include UP, F1, F5, F20, and F30, or the control device positions 458 may include 0, 1, 2, 3/OPT, FULL, and which may generally correspond to the above-noted UP, HOLD, CLB/APP, TOGA, and LAND control device positions 458.

In FIG. 23, the variable camber system 300 may include a flight control computer 450 configured to compute a setting for the leading edge devices 150 and/or trailing edge devices 240. In an embodiment, the setting may be an optimum slat setting 174 determined by flight control computer 450 based on the aircraft state data 500. The flight control computer 450 may also determine an optimum flap setting 264 based on the aircraft state data 500. The aircraft state data 500 may include aircraft gross weight 502, aircraft center of gravity 504, Mach number 506, and altitude 510. The aircraft state data 500 may also include angle of attack 512, vertical speed 508, the flight phase 514, the flap lever position, and/or other aircraft parameters.

In FIG. 23, the control system 452 may be communicatively coupled to the flight control computer 450. The control system 452 may be configured to automatically command one or more leading edge devices 150 to the setting if a designated control device position 460 is selected. In some examples, the control system 452 may automatically command the slat actuation system 200 and the flap actuation system 280 to position the slats 152 and flaps 242 at the optimum setting 174, 264 when the control device 453 is moved to a designated control device position 460. The designated control device position may be a cruise position 462, a climb position or approach position 466, or other designated control device positions 460. In some examples, when the flap control lever 454 is in the cruise position 462 (i.e., the UP position), the control system 452 may automatically command the slat actuation system 200 to position the inboard slats 154 (FIG. 17) and outboard slats 156 (FIG. 17) at the respective optimum slat settings 174, and/or the control system 452 may automatically command the flap actuation system 280 to automatically command the inboard flaps 244 (FIG. 17) and outboard flaps 246 (FIG. 17) to the respective optimum flap settings 264. In addition, the control system 452 may automatically command the slat actuation system 200 and flap actuation system 280 to periodically reposition the slats 152 and flaps 242 according to a slat positioning schedule and a flap positioning schedule when the control device 453 is in a designated control device position 460 such as in the cruise position 462. In an embodiment, the control system 452 may enable automatic actuation of the slats 152 and flaps 242 in the variable camber mode 520 when the flap control lever 454 is in the cruise position 462 and the aircraft 100 is above a predetermined altitude 510 and within a predetermined airspeed or Mach number range.

Referring still to FIG. 23, the control system 452 may be configured to automatically command the slat actuation system 200 and flap actuation system 280 to actuate the leading edge devices 150 and the trailing edge devices 240 in a load alleviation mode 524. In this regard, when the control device 453 is in the cruise position 462 and the aircraft 100 is above a predetermined aircraft gross weight 502, the control system 452 may be configured to differentially deploy the inboard and outboard slats 154, 156 and flaps 244, 246 to vary the wing camber along a spanwise direction 136 causing wing lift 142 to be shifted along the spanwise direction 136 toward an inboard portion 130 of the wing 116. Such redistribution of the spanwise lift may reduce wing bending during cruise by varying the wing camber along the spanwise direction 136. In this regard, the inboard and outboard slats 154, 156 and flaps 244, 246 may be differentially deployed to de-camber an outboard portion 134 of the wing 116 to reduce lift generated by the outboard portion 134, and/or to increase wing camber on the inboard portion 130 of the wing 116 to increase lift at the inboard portion 130. The shifting of the wing lift 142 toward the inboard portion 130 may minimize the bending moment at the wing root 128 and allow for a reduction in the structural weight of the wing 116 due to the reduced bending moment.

In an embodiment, the control system 452 may also be configured to automatically command the slat actuation system 200 and flap actuation system 280 to actuate the leading edge devices 150 and trailing edge devices 240 in a drag reduction mode 526. For example, below a predetermined aircraft gross weight 502, the control system 452 may differentially deploy the leading edge devices 150 and trailing edge devices 240 to minimize aerodynamic drag on the wing 116 during cruise which may maximize the lift-to-drag ratio resulting in an increase in fuel economy, range, and/or payload capability of the aircraft 100. The above-mentioned load alleviation mode 524 and drag reduction mode 526 may include limiting the frequency with which the slats 152 and flaps 242 are actuated to conserve power. For example, actuation of the slats 152 and flaps 242 may be limited to a maximum of once every five (5) minutes.

Figure 24:
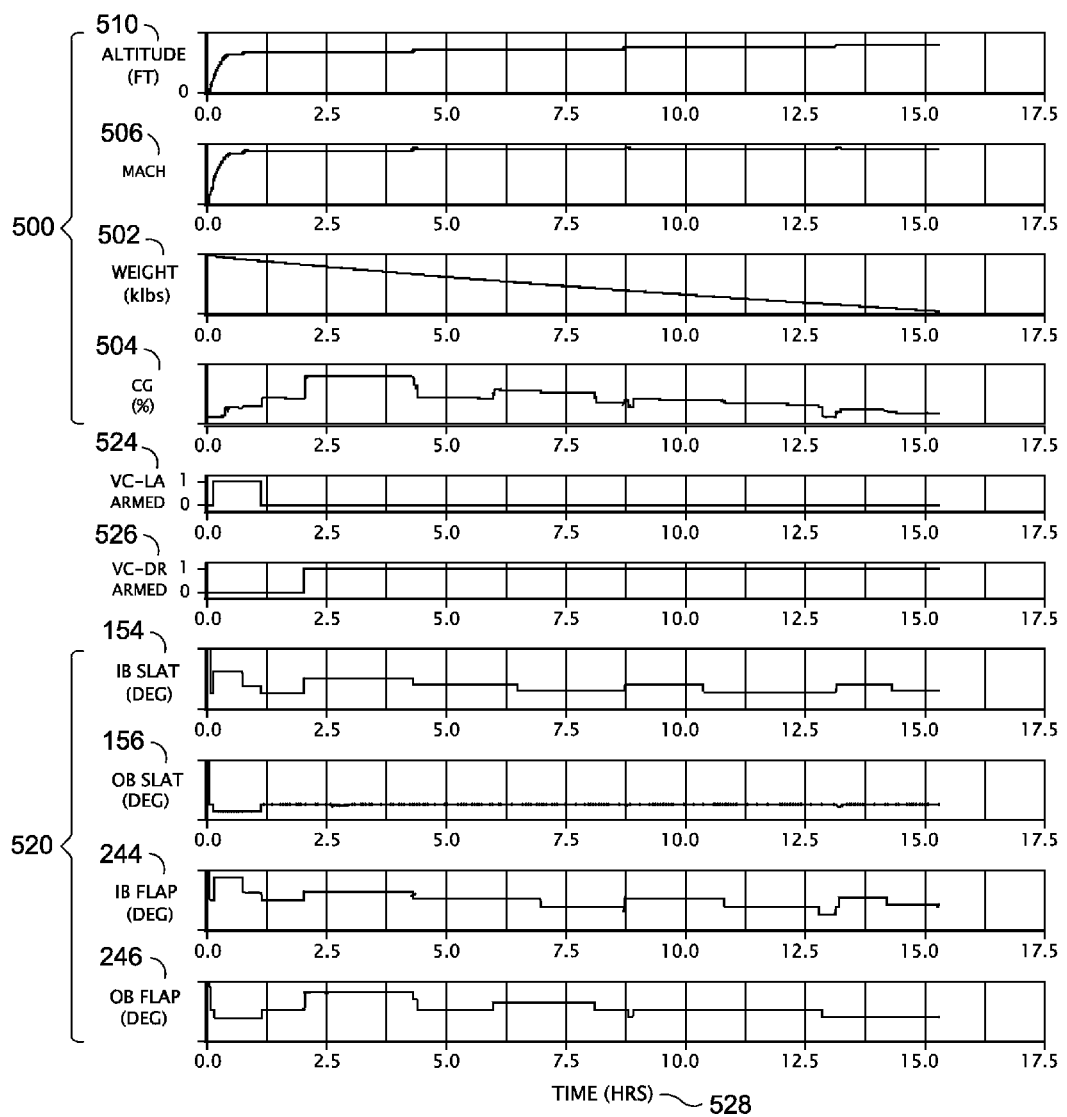
FIG. 24 shows several graphs illustrating the functionality of the variable camber system during cruise flight and the differential deployment of the inner and outer slats and inner and outer flaps as a function of the aircraft gross weight, aircraft center of gravity, Mach number, and altitude.

In FIG. 24, shown are a collection of graphs illustrating the functionality of the variable camber system 300 during cruise flight, and the differential deployment of the inboard and outboard slats 154, 156, and the inboard and outboard flaps 244, 246 as a function of aircraft state data 500. The aircraft state data 500 may include altitude 510, Mach number 506, aircraft gross weight 502, and aircraft center of gravity 504 plotted over time 528 (e.g., in hours) representing the duration of an aircraft mission. Also shown is a plot illustrating the enablement of the load alleviation mode 524 during an early stage of the mission when the aircraft gross weight 502 is at a maximum. Also shown is a plot illustrating the enablement of a drag reduction mode 526 when the aircraft 100 is in reduced aircraft gross weight 502 and above a predetermined altitude 510. Also shown are plots illustrating the slat deflection angles 170 of the inboard slats 154 and outboard slats 156 illustrating the differential deployment thereof according to the slat positioning schedule. Likewise, shown are plots illustrating the flap deflection angles 260 of the inboard flaps 244 and outboard flaps 246 illustrating the differential deployment thereof according to a flap positioning schedule.

In FIG. 24, in the load alleviation mode 524 during an early stage of the mission, the flight control computer 450 may continuously compute the optimum slat setting 174 and optimum flap setting 264 for each one of the inboard and outboard slats 154, 156 and flaps 244, 246 based on aircraft state data 500 such as aircraft gross weight 502 and aircraft center of gravity 504. The load alleviation mode 524 may be automatically activated at relatively high gross weights when the aircraft 100 is in cruise flight at cruising speeds. The control system 452 may periodically (e.g., every five minutes, ten minutes, etc.) reposition the slats 152 and flaps 242 to weight-CG scheduled surface deflection angles in an upward direction 166 and/or downward direction 168 within the limits of the above described slat deflection angle 170 and flap deflection angle 260 as shown in FIG. 5. The drag reduction mode 526 may be automatically activated when the aircraft gross weight 502 falls below a predetermined limit and the aircraft 100 is operating within an altitude-Mach number envelope during climb, cruise, and/or descent, and/or and at low altitude 510 cruise speeds such as during a diversion to an airport following an emergency descent. The control system 452 may also periodically reposition the slats 152 and flaps 242 to weight-CG-altitude-airspeed scheduled surface deflection angles in an upward direction 166 and/or downward direction 168 in the variable camber mode 520.

Figure 25:
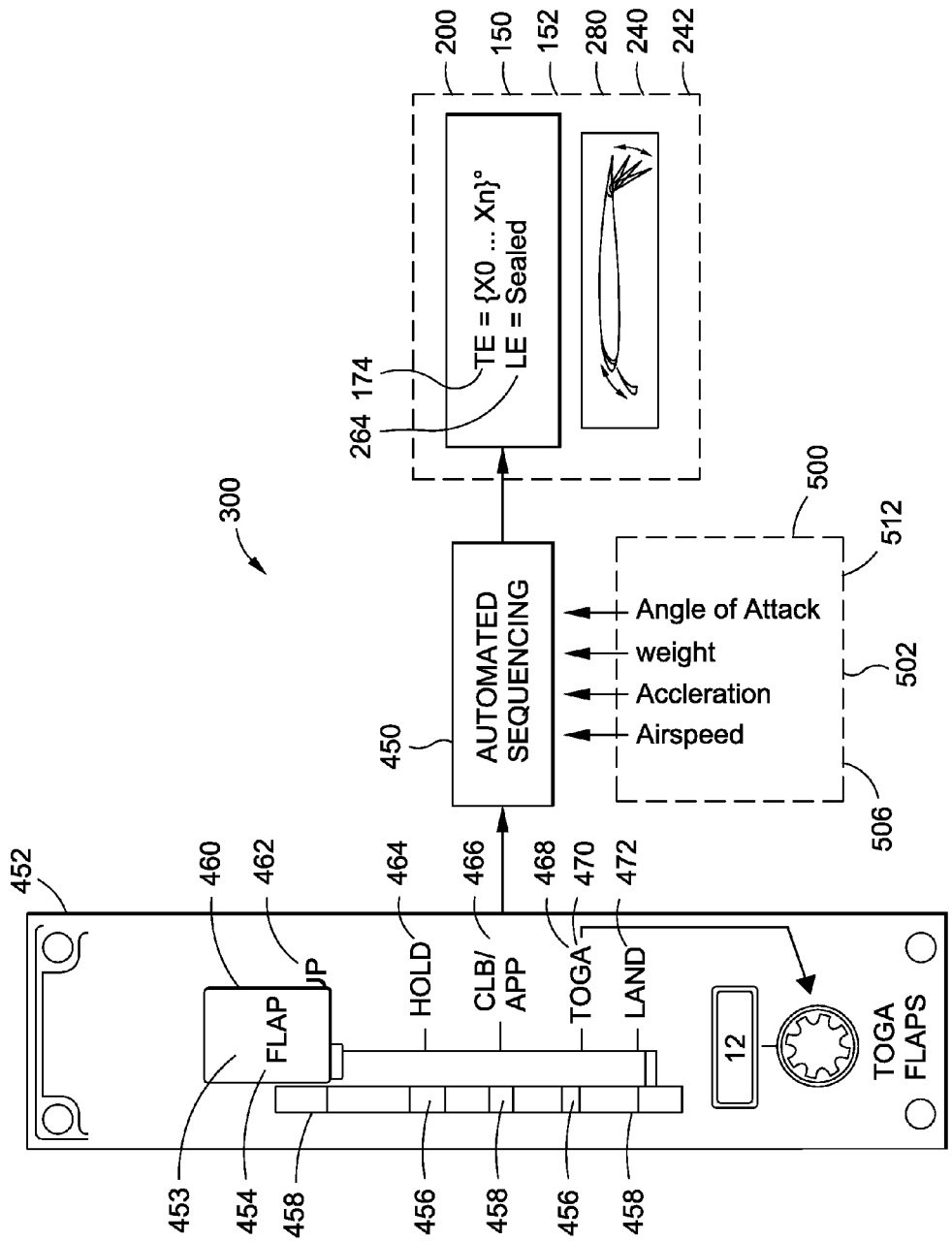
FIG. 25 is a diagrammatic view of an embodiment of a control system for automated sequencing of the slats and flaps during climb or descent, and illustrating the flight control computer determining an optimum slat setting and an optimum flap setting.

In FIG. 25, shown is a diagrammatic view of the control system 452 with the flight control computer 450 being configured to determine and/or implement an automated slat sequence and flap sequence during the climb-out phase of a mission and/or during the descent phase of a mission. The flight control computer 450 may determine an optimum slat setting 174 and an optimum flap setting 264 based on aircraft state data 500. When the control device 453 (e.g., the flap control lever 454) is moved to the climb position 466 or the approach position 466 (e.g., the CLB/APP designation), the control system 452 may automatically command the slat actuation system 200 and the flap actuation system 280 to automatically actuate the slats 152 and flaps 242 at the optimum slat setting 174 and optimum flap setting 264 according to a predetermined extension schedule during descent, and according to a predetermined retraction schedule during climb. When the control device 453 (e.g., flap control lever 454) is moved to at least one of a climb position and an approach position, slats 152 may be extended to a sealed position 182 (FIG. 4) such that the slat upper edge 178 is sealed against and/or is in contact with the wing upper surface 122. By limiting the extension of the slats 152 to the sealed position 182 (FIG. 4) instead of the gapped position 184 (FIG. 4), aerodynamic drag may be minimized which may be desirable during the latter stages of a climb after takeoff. During approach, limiting the extension of the slats 152 to the sealed position 182 may minimize aerodynamic noise (e.g., community noise) relative to the amount of aerodynamic noise that may otherwise be generated if the slats 152 were extended to the gapped position 184.

Figure 26:
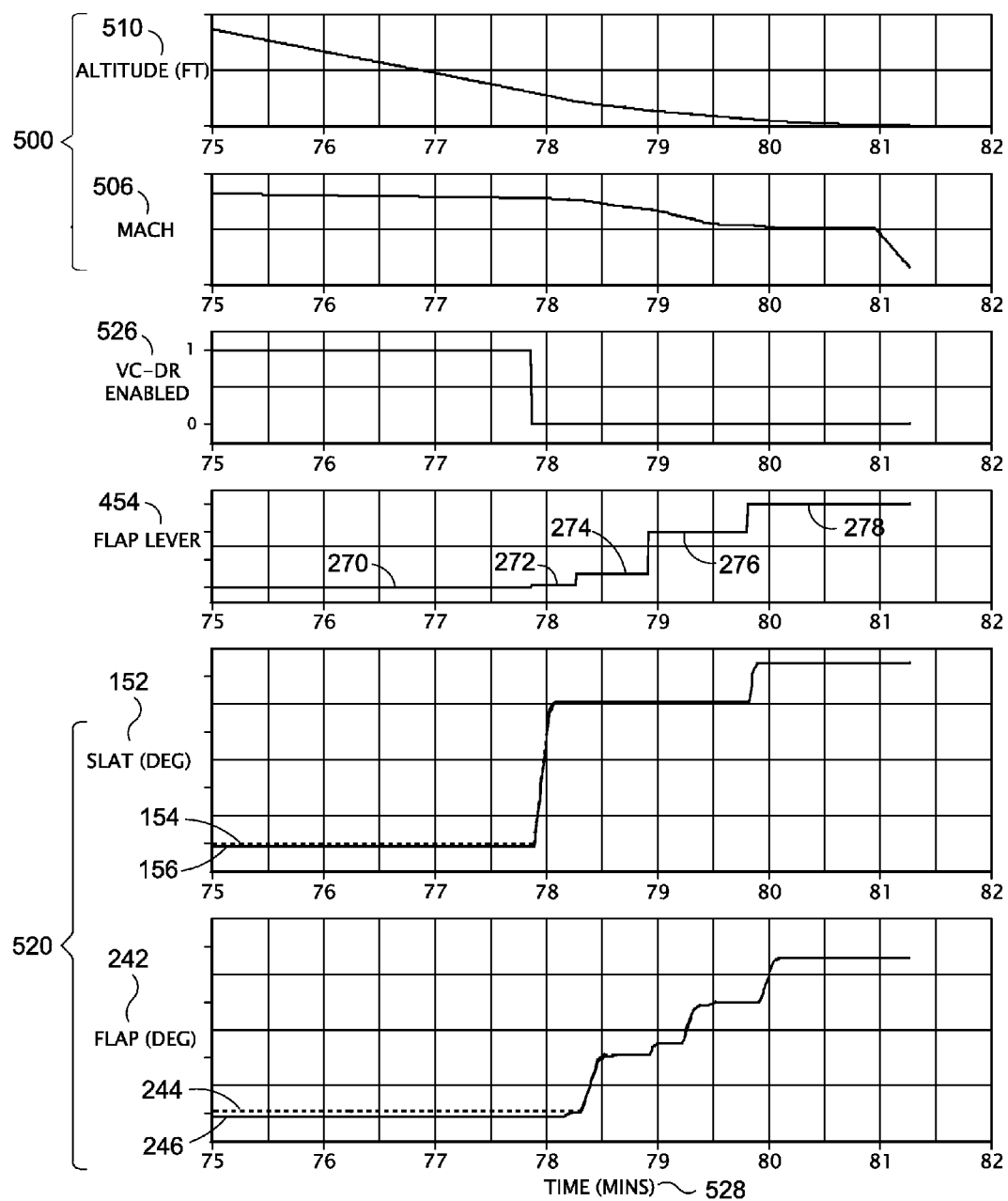
FIG. 26 shows several graphs illustrating the functionality of the variable camber system during a descent of an aircraft and illustrating the automated sequencing of the slats and flaps and the differential deployment of the inner and outer slats and flaps as a function of Mach number and altitude.

In FIG. 26, shown are a collection of graphs illustrating the functionality of the variable camber system 300 during the descent of an aircraft 100 and illustrating the differential deployment of the inboard and outboard slats 154, 156 and flaps 244, 246 as a function of the aircraft state data 500. The aircraft state data 500 includes altitude 510 and Mach number 506 plotted over time 528 in minutes. Also shown are the flap lever positions and the corresponding sequence of extension of the slats 152 and flaps 242. The plots illustrate the slat deflection angles 170 and flap deflection angles 260, and show the inboard slats 154 and flaps 244 in dashed lines and the outboard slats 156 and flaps 246 in solid lines to illustrate the differential deployment thereof according to automated slat sequencing and flap sequencing during descent.

Figure 27:
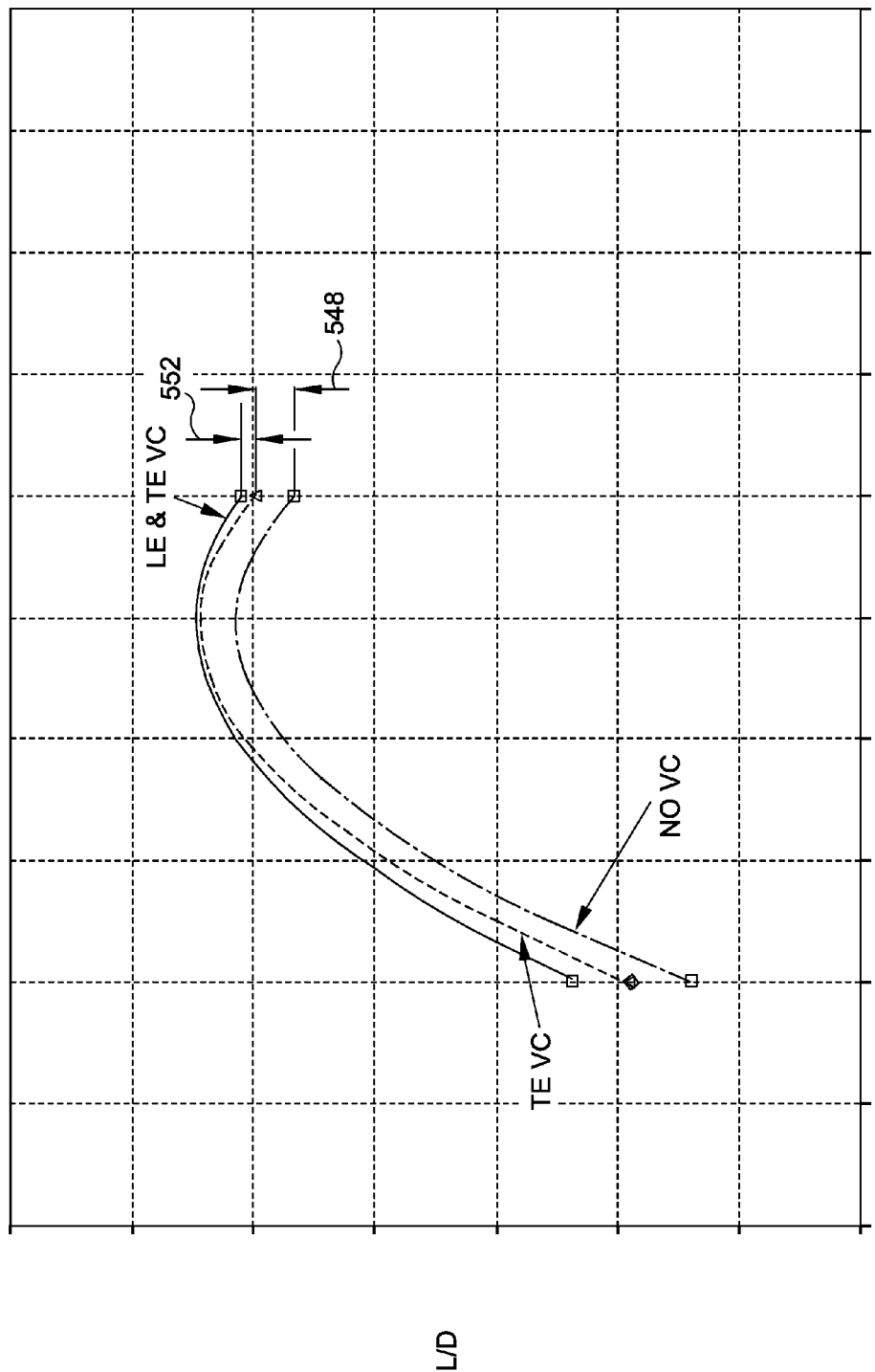
FIG. 27 is a graph plotting lift-to-drag ratio (L/D) as a function of coefficient of lift and illustrating an increase in the L/D as a result of the variable camber provided by the combination of the leading edge slats and the trailing edge flaps.

In FIG. 27, shown is a graph plotting lift-to-drag ratio (L/D) 540 as a function of coefficient of lift 542 for a wing in different configurations. The graph includes a plot of L/D 540 versus coefficient of lift 542 for a wing without leading edge or trailing edge variable camber capability 544 (i.e., "NO VC"). Also shown on the graph is a plot of L/D 540 versus coefficient of lift 542 for a wing implementing variable camber capability 546 using only trailing edge devices (i.e., "TE VC"). A comparison of the "NO VC" plot with the "TE VC" plot illustrates an increase 548 in L/D provided by trailing edge variable camber 546 relative to a wing without any variable camber capability 544. The graph additionally includes a plot of L/D 540 versus coefficient of lift 542 for a wing implementing both trailing edge variable camber and leading edge variable camber 550 (i.e., "LE & TE VC"). A comparison of the "TE VC" plot with the "LE & TE VC" plot illustrates an additional increase 552 in L/D 540 provided by the combination of leading edge and trailing edge variable camber capability 550 relative to a wing having only trailing edge variable camber capability 546.

As can be seen in the graph of FIG. 27, implementation of variable camber capability in a chordwise direction and/or in a spanwise direction of the wing may provide a significant reduction in aerodynamic drag as reflected in increased L/D, and which may translate into improved fuel efficiency, extended cruise range, and/or increased payload (e.g., passengers, cargo) capability for an aircraft. Variable camber capability along a spanwise direction may also provide a means for redistributing spanwise lift to shift the wing loading from the outboard portion of the wings to the inboard portion to reduce wing root bending. The reduction in wing root bending may allow for a reduction in the sizing of the wing root structure which may allow for a reduction in aircraft structural weight and which may translate into an increase in fuel efficiency, range, and/or payload capability.

Figure 28:
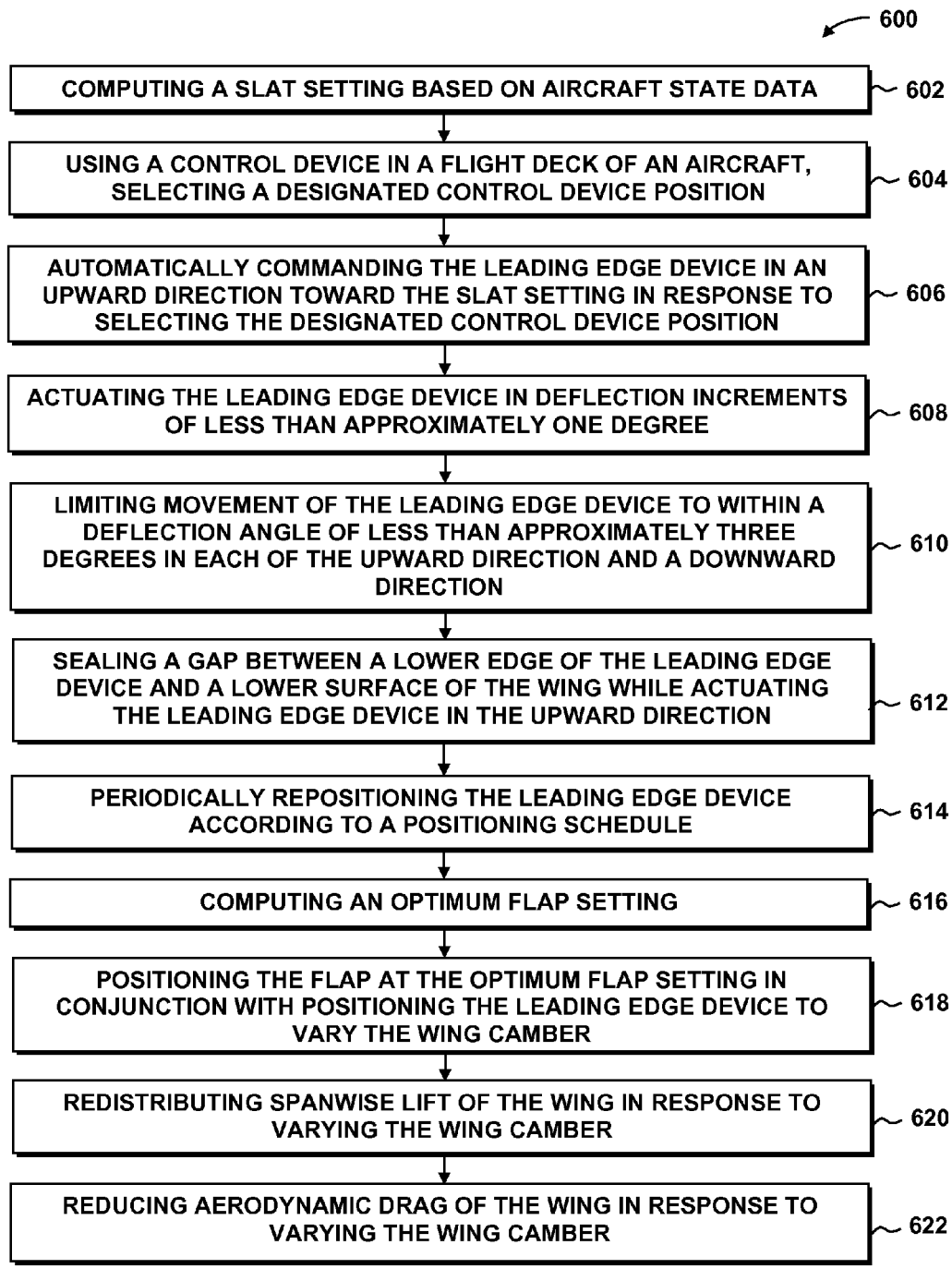
FIG. 28 is an illustration of a flow chart having one or more operations that may be included in a method of varying the wing camber of a wing.

In FIG. 28, shown is a flow chart containing one or more operations that may be included in a method 600 of varying the wing camber of a wing 116. It will be understood that one or more of the steps depicted in FIG. 28 may be optional and/or the steps may, in some examples, be performed in a different order without departing from the scope of the present disclosure. Step 602 of the method may include computing a slat setting based on aircraft state data. In some examples, the setting may be computed using a flight control computer 450. The setting may be an optimum slat setting 174 for an inboard slat 154 and an outboard slat 156 based on aircraft state data 500. As indicated above, the aircraft state data 500 may include aircraft gross weight 502, aircraft center of gravity 504, Mach number 506, altitude 510, and may additionally include angle of attack 512, vertical speed 508, flight phase 514, flap lever position, and other parameters. The flight control computer 450 may periodically or continuously compute the optimum slat setting 174 for each one of the inboard and outboard slats 154, 156, based on the aircraft state data 500.

Step 604 of the method 600 of FIG. 28 may include using a control device 453 in a flight deck of the aircraft and selecting with the control device 453 a designated control device position. In some embodiments, the method 600 may include moving a control device 453 to a designated control device position 460 such as to one of a cruise position 466, a climb position or an approach position 466. For example, the flap control lever 454 may be moved into the cruise position 462 (FIG. 23) which may allow the control system 452 to operate in a variable camber mode 520. The flap control lever 454 may also be moved into the climb position and/or approach position 466 (FIG. 25) for initiating an automatic sequencing for positioning the slats 152 and/or the flaps 242.

Step 606 of the method 600 of FIG. 28 may include actuating a leading edge device 150 of an aircraft 100 in an upward direction 166 relative to a retracted position 158 of the leading edge device 150 to reduce a camber of the wing 116 while the aircraft 100 is in flight. In some embodiments, the leading edge device 150 may comprise one or more slats 152 coupled to a slat actuation system 200. The method may include actuating, using the slat actuation system 200, one or more slats 152 in the upward direction 166 and/or the downward direction 168 relative to the retracted position 158. In some examples, the method may include automatically commanding one or more leading edge devices 150 to a slat setting in response to selecting a designated control device position 160. The slat setting may be computed by the flight control computer 450 based on aircraft state data 500 as indicated above. In other examples, the method may include automatically commanding the slat actuation system 200 to position the inboard slats 154 and outboard slats 156 at the respective optimum slat settings 174 in response to moving the control device 453 to the designated control device position 460 such as the cruise position 462. The method may include actuating a slat 152 in an upward direction 166 relative to a retracted position 158 of the slat 152 on a fixed leading edge 118 of a wing 116 as shown in FIG. 11. When the slat 152 is in the upward position 162, a forward-most point on the slat 152 leading edge may be higher than the forward-most point on the slat 152 leading edge when the slat 152 is in the retracted position 158. The method may also include actuating the slat 152 in a downward direction 168 relative to a retracted position 158 of the slat 152 on a fixed leading edge 118 of a wing 116 as shown in FIG. 12.

Step 608 of the method 600 of FIG. 28 may include actuating one or more leading edge devices 150 in deflection increments of less than approximately one (1) degree. In some examples, the method may include actuating inboard slats 154 and/or outboard slats 156 in relatively small slat deflection increments 172 to allow the slats 152 to be positioned near the optimal slat setting 174. Likewise, the inboard flaps 244 and outboard flaps 246 may be actuated in relatively small flap deflection increments 262. In an embodiment, the slats 152 and flaps 242 may be actuated in deflection increments of less than approximately two (2) degrees, and more preferably in deflection increments of less than approximately 0.5 degrees, such as in deflection increments of approximately 0.3 degrees or less.

Step 610 of the method 600 of FIG. 28 may include limiting movement of one or more leading edge devices 150 to within a deflection angle of less than approximately three (3) degrees in each of the upward direction 166 and a downward direction 168 relative to the retracted position 158 in response to selecting the cruise position 462. In some example, the method may include limiting slat 152 movement to a slat deflection angle 170 (FIG. 5) of less than approximately three degrees in each of the upward direction 166 (FIG. 5) and/or the downward direction 168 (FIG. 5) relative to the retracted position 158 of the slat 152 when the control device 453 (e.g., flap control lever 454) is in the cruise position 462. Likewise, the method may include limiting flap 242 movement to a flap deflection angle 260 (FIG. 5) of less than approximately three (3) degrees in each of the upward direction 256 and the downward direction 168 relative to the retracted position 248 of the flap 242. Actuation of the slats 152 and flaps 242 in the variable camber mode 520 may allow for chordwise variation of the wing camber and/or spanwise variation of the wing camber to optimize the aerodynamic performance of the wings 116.

Step 612 of the method 600 of FIG. 28 may include sealing a lower gap 190 between a lower edge of the leading edge device 150 and a lower surface of the wing 116 while actuating the leading edge device 150 in the upward direction 166. In some examples, the lower gap 190 may be sealed by a flexible slat lower seal 222 extending between a slat lower edge 186 and a wing lower surface 124. The flexible slat lower seal 222 may seal the lower gap 190 when actuating the slat 152 within the slat deflection angle of approximately three (3) degrees in each of the upward direction 166 and the downward direction 168. For example, the method may include sealing the lower gap 190 between the slat lower edge 186 and the wing lower surface 124 using a slat lower seal 222 as illustrated in FIGS. 6-12. The method may include attaching the seal forward end 224 to the slat lower edge 186, and maintaining contact between the seal aft end 226 and the wing lower surface 124 when actuating the slat 152 to the upward position 162 relative to the retracted position 158, and/or when actuating the slat 152 downward position 164 relative to the retracted position 158. As indicated above, the slat lower seal 222 may be configured to bias the seal aft end 226 in an upward direction 166 such that the seal aft end 226 remains in substantially continuous contact with the wing lower surface 124 when the slat 152 is deflected within the slat deflection angle 170 in the upward direction 166 and the downward direction 168 when the slat is actuated in the variable camber mode 520.

Step 614 of the method 600 of FIG. 28 may include periodically repositioning the slats 152 according to a predetermined slat positioning schedule. In this regard, the method may include automatically commanding, using the control system 452, the slat actuation system 200 according to the slat positioning schedule when the control device 453 (e.g., flap control lever 454) is in a designated control device position 460 such as in the cruise position 462, the climb position 466, and/or the approach position 466 as illustrated in FIGS. 23-26. In embodiments where the leading edge device 150 includes one or more inboard slats 154 and one or more outboard slats 156, the method may include differentially deploying the inboard slats 154 and the outboard slats 156 to vary the wing camber along a chordwise and/or spanwise direction 136.

Advantageously, the variable camber system 300 allows for actuating the inboard slat 154 and the outboard slat 156 independent of one another using the slat actuation system 200. In this regard, the inboard slats 154 and the outboard slats 156 may be actuated to differential slat 152 settings as may be determined by the flight control computer 450. In an embodiment, the method may include actuating, using a variable camber trim unit (VCTU) 302, the outboard slats 156 independently of the inboard slats 154. As indicated above, the VCTU electric motor 304 may operate in conjunction with the speed sum gearbox 320 to rotate the outboard shaft 352 independent of the inboard shaft 351 in a manner causing the outboard slat 156 to be actuated independent of the inboard slat 154.

The method may include operating a VCTU 302 in conjunction with a PDU 400. For example, the method may include actuating the inboard slat 154 using a central motor 406 of the PDU 400. As indicated above, each one of the VCTUs 302 may be positioned between an inboard device 144 and an outboard device 146. The inboard device 144 may be drivingly coupled to the central motor 406 of the PDU 400 which may include a central brake 414 or power-off brake.

The method may additionally include coupling the inboard device 144 and the outboard device 146 to a respective inboard shaft 351 and outboard shaft 352 of the speed sum gearbox 320 of the VCTU 302. The method may further include operating the VCTU electric motor 304 in conjunction with the speed sum gearbox 320 in such a manner as to rotate the outboard shaft 352 and the inboard shaft 351 relative to one another to control the actuation of the outboard devices 146 (e.g., outboard slats 156 and flaps 242) relative to the inboard devices 144 (e.g., inboard slats 154 and flaps 242).

In an embodiment, the operation of the VCTU electric motor 304 in conjunction with the speed sum gearbox 320 of the VCTU 302 may include activating the VCTU electric motor 304 to cause rotation of the outboard shaft 352 independent of the inboard shaft 351, and actuating the outboard device 146 independent of the inboard device 144. The actuation of the outboard device 146 independent of the inboard device 144 may include applying a central brake 414 coupled to the central motor 406, and preventing movement of the inboard device 144 in response to applying the central brake 414.

In a further embodiment, the VCTU 302 may be operated in conjunction with the PDU 400 to actuating the inboard and outboard devices 144, 146 in unison. In this regard, the method may include applying the power-off brake 310 of the VCTU electric motor 304, and preventing rotation of the VCTU electric motor 304 in response to applying the power-off brake 310. The method may further include activating the central motor 406, actuating the inboard device 144 in response to activating the central motor 406, and drivingly rotating the inboard shaft 351 in response to actuating the inboard device. The method may additionally include rotating the outboard shaft 352 using the inboard shaft 351 as result of applying the power-off brake 310 and preventing rotation of the VCTU electric motor 304, and resulting in the actuation of the inboard device 144 and the outboard device 146 in unison.

The VCTU 302 may also be operated in conjunction with the PDU 400 to actuating the inboard device 144 independent of the outboard device 146. In this regard, the method may include applying the outboard brake 354 of the VCTU 302, preventing movement of the outboard device 146 in response to applying the outboard brake 354, and activating the central motor 406 to cause rotation of the inboard torque tube 294. With the outboard brake 354 applied, rotation of the inboard torque tube 294 may result in the actuation the inboard device 144 independent of the outboard device 146.

Step 616 of the method 600 of FIG. 28 may include computing, using the aircraft state data 500, an optimum flap setting 264 for a flap 242 coupled to a trailing edge 120 of the wing 116. As indicated above, the aircraft state data 500 may include aircraft gross weight 502, aircraft center of gravity 504, Mach number 506, altitude 510, and other aircraft state parameters. The flight control computer 450 may continuously compute the optimum flap setting 264 for each one of the inboard and outboard flaps 244, 246 such that when the control device 453 is moved to a designated control device position 460 such as the cruise position 462, the control system 452 may automatically command the flaps 242 to the optimum flap setting 264 which may result in varying the wing camber along a chordwise direction and/or along a spanwise direction 136 of the wing 116.

Step 618 of the method 600 of FIG. 28 may include positioning, using the flap actuation system 280, the inboard flaps 244 and outboard flaps 246 to the respective optimum flap settings 264. A positioning of the inboard flaps 244 and outboard flaps 246 may be performed in conjunction with the positioning of the inboard slats 154 and outboard slats 156 to the respective optimum slat settings 174.

Step 620 of the method 600 of FIG. 28 may include redistributing the spanwise lift in response to varying the wing camber when the slats 152 and/or flaps 242 are actuated in a load alleviation mode 524. The method may include selecting the cruise position 462 using the control device 453. For example, the method may include moving the control device 453 to the cruise position 462 such as by a pilot on the flight deck manually moving the flap control lever 454 to the cruise position 462 when the aircraft approaches or reaches cruising altitude. The method may also include determining an aircraft gross weight 502, and providing the aircraft gross weight 502 to the flight control computer 450. The method may include comparing an aircraft gross weight to a threshold value. If the aircraft gross weight exceeds the threshold value, the method may include automatically commanding differential deployment of the inboard slat(s) 154 and the outboard slat(s) 156 in a manner causing a decrease in wing lift at an outboard portion 134 of the wing 116 as compared to an inboard portion 130 of the wing 116. In this regard, the differential deployment of the inboard slats 154 and the outboard slats 156 may cause wing lift 142 to be shifted along a spanwise direction 136 from the outboard portion 134 of the wing 116 toward the inboard portion 130. The slats 152 and flaps 242 may be commanded in a manner to reduce the wing camber on the outboard portion 134 of the wing 116, and increase the wing camber on the inboard portion 130 of the wing 116. The method may further include redistributing the spanwise lift by reducing the wing lift 142 at the outboard portion 134 relative to the inboard portion 130 in response to reducing the wing camber at the outboard portion 134, and reducing the wing bending moment at the wing root 128 in response to redistributing the spanwise lift.

Step 622 of the method 600 of FIG. 28 may include reducing aerodynamic drag in response to varying the wing camber when the slats 152 and/or flaps 242 are actuated in a drag reduction mode 526. The method may include moving the control device 453 to the cruise position 462, and determining, by a flight control computer 450, whether the aircraft gross weight 502 is below a predetermined limit. In an embodiment, the flight control computer 450 may compare the aircraft gross weight to a threshold value. If the aircraft gross weight does not exceed the threshold value, the method may include automatically commanding the inboard slat(s) 154 and the outboard slat(s) 156 to respective positions selected to minimize aerodynamic drag of the wing 116. In an embodiment, when the aircraft gross weight 502 is below a predetermined limit, the method may include automatically commanding the slat actuation system 200 and flap actuation system 280 to differentially deploy the inboard and outboard slats 154, 156 and flaps 244, 246 in a manner to minimize aerodynamic drag of the wing 116. The minimization of aerodynamic drag may result in maximizing the lift-to-drag (L/D) ratio which may improve fuel efficiency and/or extend the range or payload capability of the aircraft 100

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for varying a wing camber, comprising:
a flight control computer configured to compute an optimum slat setting based on aircraft state data;
a control system communicatively coupled to the flight control computer, the control system including a control device moveable to any one of a plurality of control device positions including a designated control device position selected by the control device for selecting any one of a plurality of corresponding standard flap settings;
a leading edge device coupled to a wing of the aircraft;
a slat actuation system communicatively coupled to the control system and configured to actuate the leading edge device;
the leading edge device configured to be actuated in an upward direction and a downward direction relative to a retracted position of the leading edge device; and
wherein the control system is configured to automatically command the slat actuation system to move the leading edge device in one of the upward direction and the downward direction to the optimum slat setting response to manual movement of the control device during flight to the designated control device position.

2. The system of claim 1, wherein:
the actuation system is configured to actuate the leading edge device in deflection increments of less than approximately one degree.

3. The system of claim 1, wherein:
the designated control device position is a cruise position, a climb position, or an approach position.

4. The system of claim 3, wherein:
the leading edge device is limited to movement within a deflection angle of less than approximately three degrees in the upward direction and/or a downward direction relative to the retracted position if the control device is in the cruise position.

5. The system of claim 1, wherein:
the aircraft state data includes at least one of the following: aircraft gross weight, aircraft center of gravity, Mach number, and altitude.

6. The system of claim 1, wherein:
the control system is configured to automatically command the actuation system to periodically reposition the leading edge device according to a slat positioning schedule while the control device is in the designated control device position.

7. The system of claim 6, wherein:
the leading edge device includes an inboard slat and an outboard slat; and
the actuation system is configured to actuate the inboard slat independently of the outboard slat.

8. The system of claim 7, wherein:
the actuation system includes a variable camber trim unit (VCTU) positioned between the inboard slat and the outboard slat; and
the VCTU configured for differential deployment of the outboard slat and the inboard slat.

9. The system of claim 1, wherein:
the leading edge device includes an inboard slat and an outboard slat; and
the control system is further configured to command differential deployment of the inboard slat and the outboard slat to vary the wing camber along a spanwise direction of the wing.

10. The system of claim 1, wherein the leading edge device comprises a slat, the system further comprising:
a seal coupled to a lower edge of the slat and extending toward a lower surface of the wing; and
the seal configured to maintain contact with the lower surface of the wing when the slat is moved in the upward direction and/or the downward direction relative to the retracted position.

11. An aircraft, comprising;
a flight control computer configured to compute an optimum slat setting based on aircraft state data;
a control system communicatively coupled to the flight control computer, the control system including a control device moveable to any one of a plurality of control device positions including a designated control device position selected by the control device for selecting any one of a plurality of corresponding standard flap settings;
a wing including a leading edge;
a slat coupled to the leading edge;
a slat actuation system communicatively coupled to the control system and configured to actuate the slat in an upward direction and a downward direction relative to a retracted position of the slat; and
wherein the control system is configured to automatically command the slat actuation system to move the slat in one of the upward direction and the downward direction to the optimum slat setting in response to manual movement of the control device during flight to the designated control device position.

12. A method of varying a wing camber, the method comprising:
computing an optimum slat setting based on aircraft state data;
manually selecting a designated control device position using a control device in a flight deck of an aircraft, the control device moveable to any one of a plurality of control device positions for selecting any one of a plurality of corresponding standard flap settings; and
automatically actuating a leading edge device of the aircraft in an upward direction to the optimum slat setting relative to a retracted position of the leading edge device in response to manually selecting the designated control device position to reduce a camber of the wing while the aircraft is in flight.

13. The method of claim 12, wherein actuating the leading edge device comprises:
actuating the leading edge device in deflection increments of less than approximately One degree.

14. The method of claim 12, wherein the leading edge device comprises a slat coupled to a slat actuation system, the method further comprising:
actuating the slat with the slat actuation system in the upward direction and/or a downward direction relative to the retracted position.

15. The method of claim 12, wherein selecting the designated control device position comprises:
selecting one of a cruise position, a climb position, and an approach position.

16. The method of claim 12, wherein:
the aircraft state data includes at least one of the following; aircraft gross weight, aircraft center of gravity, Mach number, and altitude.

17. The method of claim 16, wherein actuating the leading edge device includes:
actuating an inboard slat and an outboard slat coupled to the leading edge; and automatically commanding, using a control system, a slat actuation system to periodically reposition the inboard slat and the outboard slat according to a slat positioning schedule when the control device is in the designated control device position.

18. The method of claim 12, wherein the leading edge device includes an inboard slat and an outboard slat, the method further comprising:

differentially deploying the inboard slat and the outboard slat to vary the wing camber along a spanwise direction.

19. The method of claim 12, wherein the leading edge device includes an inboard slat and an outboard slat, the method further comprising:

actuating the outboard slat independently of the inboard slat.

20. The method of claim 15, wherein the leading edge device includes an inboard slat and an outboard slat, the method further comprising:

selecting the cruise position;
comparing an aircraft gross weight to a threshold value;
if the aircraft gross weight exceeds the threshold value, automatically commanding differential deployment of the inboard slat and the outboard slat in a manner causing a decrease in wing lift at an outboard portion of the wing as compared to an inboard portion of the wing; and
if the aircraft gross weight does not exceed the threshold value, automatically commanding the inboard slat and the outboard slat to respective positions selected to minimize aerodynamic drag of the wing.

21. The method of claim 15, farther comprising:

limiting movement of the loading edge device to within a deflection angle of less than approximately three degrees in each of the upward direction and a downward direction relative to the retracted position it response to selecting the cruise position.

22. The method of claim 12, further comprising:

scaling a gap between a lower edge of the leading edge device and a lower surface of the wing while actuating the leading edge device in the upward direction.

* * * * *